(12) United States Patent
Sugaya

(10) Patent No.: US 6,922,280 B1
(45) Date of Patent: Jul. 26, 2005

(54) OPTICAL AMPLIFYING APPARATUS, OPTICAL ADD/DROP MULTIPLEXER, AND OPTICAL AMPLIFYING METHOD

(75) Inventor: Yasushi Sugaya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 728 days.

(21) Appl. No.: 09/678,734

(22) Filed: Oct. 4, 2000

(30) Foreign Application Priority Data

Oct. 4, 1999 (JP) ............................................ 11-283039

(51) Int. Cl.$^7$ ................................................ H01S 3/00
(52) U.S. Cl. .................. 359/337; 359/341.42
(58) Field of Search ............................ 359/337, 341.92

(56) References Cited

U.S. PATENT DOCUMENTS 6,067,187 A * 5/2000 Onaka et al. ............... 359/341
6,172,801 B1 * 1/2001 Takeda et al. .............. 359/337

FOREIGN PATENT DOCUMENTS

JP 409153865 A * 6/1997

OTHER PUBLICATIONS

Junya, Kosaka, Patent Abstracts of Japan of JP (A), No. Hei 9–98136, Apr. 8, 1997.

Isato, Osako, Patent Abstracts of Japan of JP (A), No. Hei 8–46575, Feb. 16, 1996.

Makoto, Yamamoto, Patent Abstracts of Japan of JP (A) No. Hei 9–224016, Aug. 26, 1997.

Masabumi, Koga et al., Patent Abstracts of Japan of JP (A) No. Hei 9–162476, Jun. 20, 1997.

Shigeyuki, Aoyama, Patent Abstracts of Japan of JP (A) No. Hei 6–152521, May 31, 1994.

Sulhoff, J.W. et al., "Spectral–Hole Burning in Erbium-Doped Silica and Fluoride Fibers", IEEE Photonics Technology Letters, vol. 9, No. 12, Dec. 1997, pp. 1578–1579.

Electronics Letters, vol. 27, No. 7, Mar. 1991, pp. 560–561.

Hideki, Ishio, "Optical Amplifier and Its Use", May 30, 1992, p. 12.

Yoshihiro, Konishi, "Optical Fiber Communication Technology", Jun. 26, 1995, p. 209.

* cited by examiner

*Primary Examiner*—Mark Hellner
(74) *Attorney, Agent, or Firm*—Staas & Halsey LLP

(57) ABSTRACT

An optical amplifying apparatus is composed of a light amplifying part for amplifying light and an input light controlling part for inputting, to the light amplifying part, probe light that serves to adjust the optical power of input light of the optical amplifying part. Receiving light having constant optical power, the optical amplifying part operates stably. In particular, the optical amplifying part stably operates even in a case where input light is a WDM optical signal and the number of multiplexed optical signals increases or decreases. The OADM of the present invention comprises such an optical amplifying apparatus.

19 Claims, 10 Drawing Sheets

F I G. 1
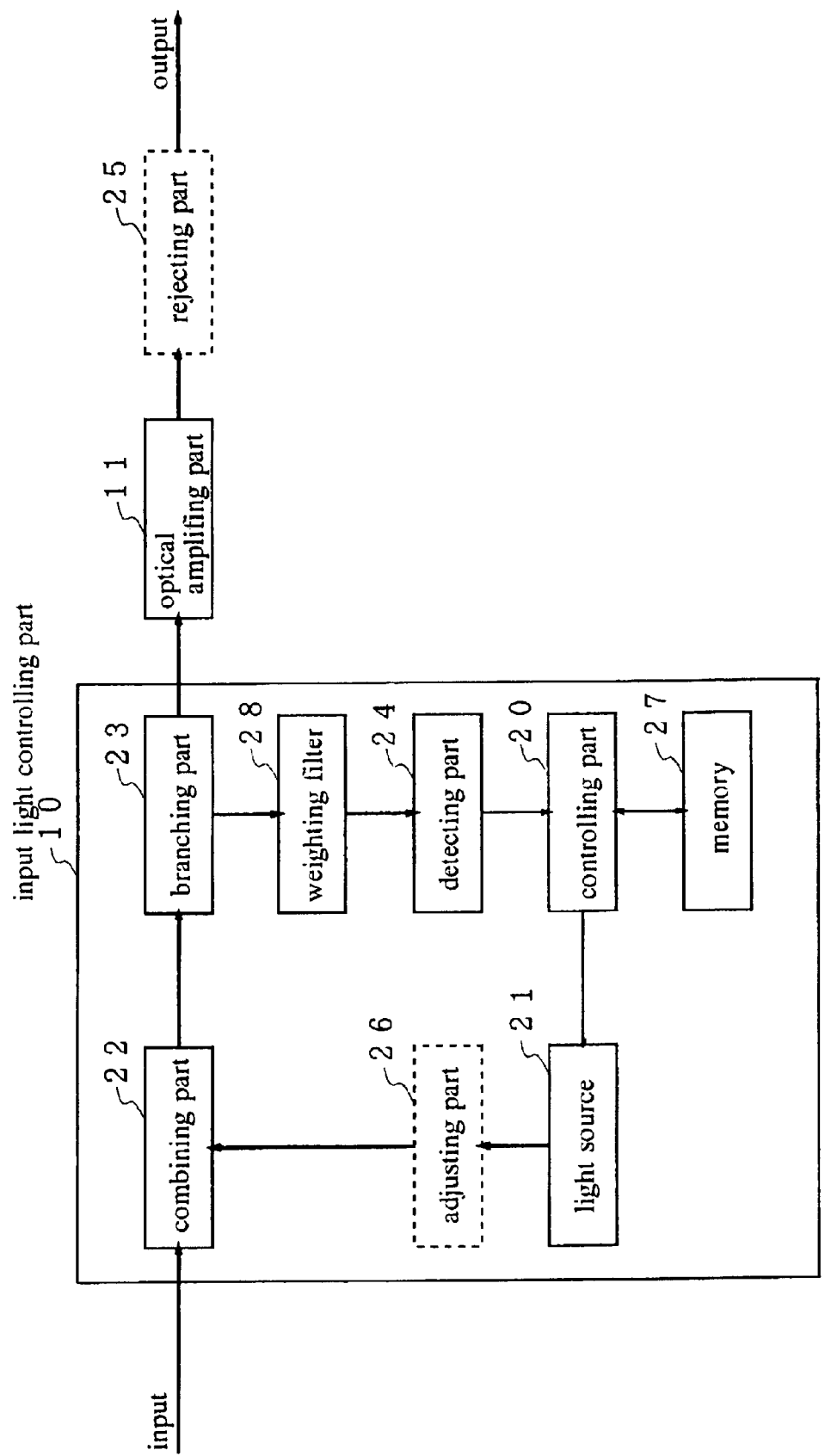

OPTICAL AMPLIFYING APPARATUS, OPTICAL ADD/DROP MULTIPLEXER, AND OPTICAL AMPLIFYING METHOD

BACKGROUND OF THE INVENTION

1. Field of the Invention

The present invention relates to an optical add/drop multiplexer for dropping and adding an optical signal to and from a wavelength-division multiplexed optical signal and passing the wavelength-division multiplexed optical signal in which input light having constant optical power is input to an optical amplifier in the optical add/drop multiplexer in spite of a variation in the number of channels of the wavelength-division multiplexed optical signal. The invention also relates to an optical amplifying apparatus used in such an optical add/drop multiplexer as well as to an optical amplifying method.

At present, ultra-long distance, large-capacity optical transmission systems are required to construct future multimedia networks. As one scheme for attaining such increase in capacity, the wavelength-division multiplexing (hereinafter abbreviated as WDM) is now being studied and developed because of its advantage that the wide bandwidth and the large capacity of the optical fiber can be utilized effectively.

In particular, in recent years, it has come to be required to realize not only optical transmission systems in which a WDM optical signal is received and transmitted between two end stations but also optical transmission systems having a network function such as an ADM (add-drop multiplexer) function. The ADM function is a function of selectively passing only optical signals having particular wavelengths of a WDM optical signal at a repeater station called a node that is provided at an intermediate position on an optical transmission line, dropping optical signals having wavelength excluding the above particular wavelengths at the node, or sending other optical signals that are added at the node to another node. In the above circumstances, the optical add/drop multiplexer (hereinafter abbreviated as OADM) having the ADM function that is a key device of optical transmission systems is now being studied extensively.

2. Description of the Related Art

In recent years, the optical amplifier capable of amplifying an optical signal as it is without converting it into an electrical signal is used in optical transmission systems.

In the optical amplifier, by supplying energy to a laser medium, electrons in the laser medium are excited and population inversion is formed there. If input light is input to the laser medium in a state that population inversion is formed there, the input light causes stimulated emission and is thereby amplified.

For example, the optical fiber amplifier amplifies input light in such a manner that electrons of a rare earth element are given population inversion by supplying pump light to an rare-earth-ion-doped optical fiber. The semiconductor optical amplifier amplifies input light in such a manner that electron population inversion is formed by supplying an injection current (driving current) to a semiconductor active layer such as a pn junction.

FIG. 10 shows how the gain varies as the optical power of input light varies in a case where the excitation energy for forming population inversion is kept constant.

In FIG. 10, the horizontal axis represents the optical power of input light to an optical amplifier and the vertical axis represents the gain of the optical amplifier. FIG. 10 shows a case of large excitation energy and a case where the excitation energy is smaller than in the former case.

As shown in FIG. 10, where the excitation energy is kept constant, when the optical power of input light is increased the gain is kept constant in a certain range of the optical power. However, when the optical power of input light is increased beyond the above range, the gain decreases gradually. This is due to the following reason.

The number of electrons at upper level is constant because the excitation energy is constant. Therefore, when the optical power of input light is small, electrons at upper level that are consumed by stimulated emission exist in a sufficient number and hence a constant gain is obtained. However, when the optical power of input light is large, the number of electrons at upper level is insufficient and hence the gain lowers.

For example, this phenomenon is described on page 12 of "Optical Amplifier and Its Applications" (supervised by Hideki Ishio, Ohmsha, Ltd.) and page 209 of "Optical fiber Communication Technology" (supervised by Yoshihiro Konishi, The Nikkan Kogyo Shinbun, Ltd.).

On the other hand, it is known that the gain-wavelength characteristic of the optical amplifier varies with the wavelength of input light.

In the optical amplifier, spectral-hole burning occurs which is a phenomenon that when input light having large optical power concentrated in a single wavelength is input, the gain at the wavelength of the input light becomes smaller than in a case where the input light is absent or smaller.

Therefore, in the case of using the optical amplifier, to obtain a prescribed gain, it is necessary to determine an operating point of the optical amplifier in consideration of the optical power of input light and other factors.

Incidentally, in an optical communication system having an OADM, optical signals (channels) are added to or dropped from a WDM optical signal in the OADM and hence the optical power of the WDM optical signal varies. Therefore, the optical power of input light varies in an optical amplifier for amplifying the WDM optical signal in the OADM.

In particular, the optical power of input light varies in an optical amplifier for amplifying a WDM optical signal that is input from an optical transmission line to the OADM, because the number of channels increases or decreases in an OADM disposed upstream of the OADM concerned.

An optical amplifier for amplifying a WDM optical signal consisting of optical signals (channels) that pass through the OADM concerned has a problem that the optical power of input light varies because an arbitrary number of optical signals (channels) are dropped by a dropping unit in the OADM.

Further, in an optical amplifier for amplifying a WDM optical signal to be output of the OADM concerned, the optical power of input light varies because an arbitrary number of optical signals (channels) are added to a WDM optical signal that pass through the OADM by an adding unit in the OADM.

SUMMARY OF TEE INVENTION

An object of the present invention is to provide an optical amplifying apparatus capable of keeping the optical power of input light to be input approximately constant and resultantly capable of obtaining a certain gain.

Another object of the invention is to provide an OADM comprising an optical amplifying apparatus capable of keeping the optical power of input light approximately constant independent of increase or decrease in the number of channels of a WDM optical signal and resultantly capable of obtaining a certain gain.

Another object of the invention is to provide an optical amplifying method where the optical power of input light to be input can be approximately kept constant independent of increase or decrease in the number of channels of a WDM optical signal.

The above-mentioned object is attained by an optical amplifying apparatus comprising an optical amplifying part for amplifying light; and an input light controlling part for inputting, to the optical amplifying part, probe light that serves to adjust the optical power of input light of the optical amplifying part.

For example, the optical power of probe light is adjusted in accordance with a difference between a prescribed reference value and a value of the optical power of input light. The prescribed reference value is set at a value of the optical power of a WDM optical signal that is obtained when its number of multiplexed optical signals is at maximum. Further, for example, the optical power of probe light is adjusted in accordance with a decrease in the number of optical signals of a WDM optical signal.

In case that probe light is generated by a semiconductor laser, its optical power is adjusted by adjusting the driving current of the semiconductor laser. Alternatively, the optical power of probe light can be adjusted by an optical attenuator or an optical amplifier.

Probe light may be not only single-wavelength light but also light produced by combining a plurality of light beams having different wavelengths.

The above object is attained by an OADM comprising the above optical amplifying apparatus.

The optical amplifying apparatus and OADM above can operate stably because the optical power of input light is adjusted by using probe light. In particular, even where input light is a WDM optical signal and its number of multiplexed optical signals increases or decreases, the optical amplifying apparatus can stably operate independent of the increase or decrease.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 1 shows a block diagram of the composition of an optical amplifying apparatus having an input light controlling part according to a first embodiment of the present invention;

DESCRIPTION OF THE PREFERRED EMBODIMENTS

Figure 2:
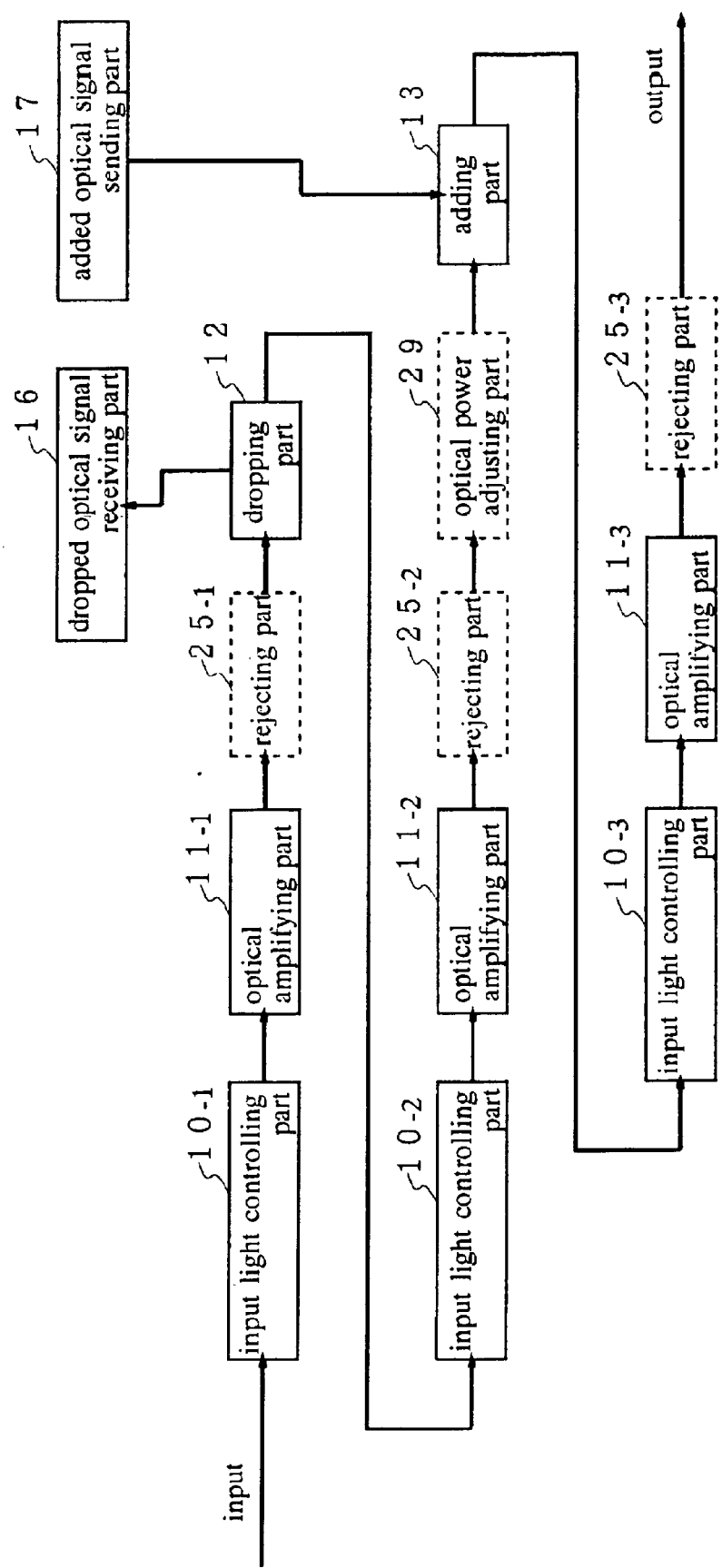
FIG. 2 shows a block diagram of the composition of an OADM according to the first embodiment that is provided with optical amplifying apparatuses having an input light controlling part.

The embodiments of the invention will be described with reference to the accompanying drawings. In these Figures, the same constructions are designated by the same reference numerals, and their repeated description may be omitted.

Embodiment 1

(Configuration)

A first embodiment relates to an optical amplifying apparatus having an input light controlling part and to an OADM that is provided with optical amplifying apparatuses having an input light controlling part.

As shown in FIG. 1., the optical amplifying apparatus according to the first embodiment is comprised of an optical amplifying part 11 for amplifying a WDM optical signal and an input light controlling part 10 for inputting probe light to the optical amplifying part 11. The probe light serves to keep optical power to be input to the optical amplifying part 11 constant in accordance with a decrease in the number of channels of a WDM optical signal.

The input light controlling part 10 is comprised of a light source 21 for generating probe light to be input to the optical amplifying part 11, a combining part 22 for inputting the probe light to the optical amplifying part 11, a detecting part 24 for detecting the optical power of light to be input to the optical amplifying part 11, a branching part 23 for branching part of the light to be input to the optical amplifying part 11 and supplies the branched part to the detecting part 24, and a controlling part 20 for controlling the optical power of the probe light so that the output from the detecting part 24 becomes approximately constant.

As described above, in the first embodiment, an input light controlling method is such that the optical power of probe light to be input to the optical amplifying part 11 for amplifying a WDM optical signal is controlled in accordance with increase or decrease in the number of channels of the WDM optical signal, whereby optical power to be input to the optical amplifying part 11 is controlled so as to be kept approximately constant.

In the first embodiment, since a decrease in the optical power of input light due to a decrease in the number of channels of a WDM optical signal to be input to the optical amplifying part 11 is compensated by probe light, the population inversion in the optical amplifying part 11 can approximately be in a prescribed state. Therefore, the operation state of the optical amplifying part 11 can be kept in a prescribed state. That is, the gain-wavelength characteristic of the optical amplifying part 11 can approximately be kept of a prescribed characteristic.

For example, the optical power of probe light is adjusted in the following-manner.

In a first method, as shown in FIG. 1, the light source 21 of the input light controlling part 10 is a semiconductor laser, for example, and the controlling part 20 controls the optical power of probe light so that the output from the detecting part 24 becomes approximately constant by adjusting the driving current of the semiconductor laser.

The output power of the semiconductor laser can be increased or decreased by increasing or decreasing the driving current. Therefore, the optical power of probe light is adjusted by adjusting the driving current of the semiconductor laser.

As shown in FIG. 1, a second method is possible in which the controlling part 20 of the input light controlling part 10 adjusts the optical power of probe light that has been output from the light source 21 by using an adjusting part 26. The adjusting part 26 is a means for attenuating or amplifying optical power, and can be such an optical device as an optical variable attenuator which adjusts the optical power of output light by attenuating the optical power of input light or an optical amplifier which adjusts the optical power of output light by amplifying the optical power of input light.

In this configuration, since the adjusting part 26 which attenuates or amplifies optical power adjusts the optical power of probe light, even if a variation occurs in the output of the light source 21 due to an environmental change, the variation can be compensated by the adjusting part 26. Therefore, probe light having prescribed optical power can be combined with a WDM optical signal.

In particular, where the light source 21 is a semiconductor laser, the oscillation wavelength of the semiconductor laser varies with increase or decrease in driving current even if the device temperature is kept constant. In another case where the light source 21 is a Fabry-Perot-resonating type laser, the oscillation wavelength varies greatly owing to mode hopping. As a result, the wavelength of probe light varies and the probe light may cause adverse effects such as crosstalk on a WDM optical signal that is wavelength-multiplexed with the probe light. In this configuration, since the optical power of probe light is adjusted by the adjusting part 26, the wavelength of the probe light can be stabilized. Since the wavelength of probe light can be kept approximately constant, the input light controlling part 10 having the above configuration can avoid the probe light's adverse effects such as crosstalk on a WDM optical signal that is wavelength-multiplexed with the probe light.

As shown in FIG. 1, a third method is possible in which the input light controlling part 10 is further provided with a memory 27 for storing the maximum operable multiplex number of a WDM optical signal and the controlling part 20 controls the optical power of probe light based on the difference between a value of the output from the detecting part 24 and a reference value greater than or equal to a value of an output from the detecting part 24 in a case where the number of multiplexed optical signals in a WDM optical signal is equal to the maximum operable number.

A maximum operable multiplex number denotes a maximum number of optical signals which can be multiplexed in a WDM optical signal in service. It corresponds to a maximum number of the channels of a WDM optical signal in service.

Usually, the amplification ability of the optical amplifying part 11 is given a margin in consideration of a possibility that the number of channels of a WDM optical signal may increase in the future. An example case is such that an OADM employs an optical amplifying part 11 having amplification ability corresponding to 128 channels in consideration of future increase in the number of channels to 128 but currently only 32 channels are used at the maximum.

In this case, in the conventional configuration, even if a WDM optical signal in which 32 waves (32: maximum operable multiplex number) are multiplexed is input to the optical amplifying part 11, the optical power of probe light should be set at a value corresponding to 96 channels. Therefore, energy is dissipated in vain in the light source 21.

In contrast, in the above configuration, since the controlling part 20 controls the optical power of probe light in the above-described manner based on the storage contents of the memory 27, it is possible to avoid giving useless power to the probe light. For example, where the maximum operable multiplex number is 32 and the reference value is a value of an output from the detecting part 24 that is produced when a WDM optical signal in which 32 waves are multiplexed is detected, the optical power of probe light may be a value corresponding to one of 0–31 waves. In another case where the maximum operable multiplex number is 32 and the reference value is a value of an output from the detecting part 24 that is produced when a WDM optical signal in which 40 waves are multiplexed is detected, the optical power of probe light may be a value corresponding to one of 8–39 waves.

As shown in FIG. 1, a fourth method is possible in which the input light controlling part 10 is further provided prior to the detecting part 24 with a weighting filter 28 in which the maximum transmittance rate is at the central wavelength in the gain wavelength band of the optical amplifying part 11 and the transmittance rate decreases as a difference between the wavelength of probe light and the central wavelength increases.

Since the gain saturation characteristic of the optical amplifying part 11 depends on the wavelength of probe light, it is necessary to determine the optical power of probe light in accordance with the wavelength of the probe light.

Therefore, after the gain saturation characteristic of the optical amplifying part 11 is determined to be a prescribed degree of gain saturation, optical power values of probe light that satisfy the prescribed degree of gain saturation is determined by, for example, a wavelength-by-wavelength measurement. Measured optical power values of probe light are converted by using, as a reference, an optical power value of probe light necessary when the wavelength of the probe light is set at the central wavelength in the gain wavelength band of the optical amplifying part 11. Based on the converted optical power values, the transmittance-wavelength characteristic of the weighting filter 28 is determined so that the optical power of probe light passed through the weighting filter 28 is kept approximately the same even if the wavelength of the probe light deviates.

Since the detecting part 24 detects probe light via such a weighting filter 28, the optical power of the probe light can be controlled properly even if the wavelength of the probe light varies owing to an environment change or the like in the light source 21.

In FIG. 1, the light source 21 in the input light controlling part 10 may be so configured as to generate probe light in which laser beams having different wavelengths are wavelength-multiplexed.

Since the above light source 21 generates probe light having prescribed optical power by wavelength-multiplexing laser beams having different wavelengths, the optical power of laser light per wavelength can be made smaller than in a case where probe light having prescribed optical power is laser light having a single wavelength. Therefore, the above light source 21 can suppress spectral-hole burning which is caused by laser light having large optical power.

In FIG. 1, the input light controlling part 10 may further be provided with a rejecting part 25 for preventing probe light amplified by the optical amplifying part 11 from being output to the outside, for example, to an optical transmission line. Probe light is eliminated from light that has been amplified by the optical amplifying part 11.

This configuration can prevent probe-light-induced non-linear optical effects (stimulated Raman scattering, four-wave mixing, and cross-phase modulation) from occurring in optical devices provided downstream of the rejecting part 25, in particular, a dispersion compensation fiber and an optical fiber for connection to the next-stage node.

Next, a description will be made of an OADM that is provided with an optical amplifying part 11 having an input light controlling part 10 that are configured in the same manner as described above.

As shown in FIG. 2, the OADM is comprised of input light controlling parts 10-1 to 10-3, optical amplifying parts 11-1 to 11-3, a dropping part 12, an adding part 13, a dropped optical signal receiving part 16, and an added optical signal sending part 17. A WDM optical signal that is input to the OADM is processed by the optical devices of the input light controlling part 10-1, the optical amplifying part 11-1, the dropping part 12, the input light controlling part 10-2, the optical amplifying part 11-2, the adding part 13, the input light controlling part 10-3, and the optical amplifying part 11-3, and then output of the OADM. The dropping part 12 drops an optical signal having a particular wavelength from the WDM optical signal. The adding part 13 adds an optical signal having a particular wavelength to the WDM optical signal from which the optical signal having the particular wavelength has been dropped by the dropping part 12. The dropped optical signal receiving part 16 receives and processes the optical signal that has been dropped by the dropping part 12. The added optical signal sending part 17 generates an optical signal to be added by the adding part 13.

Although in the OADM according to the first embodiment the input light controlling part 10 and the optical amplifying part 11 are respectively provided upstream of the dropping part 12, between the dropping part 12 and the adding part 13, and downstream of the adding part 13, there may be a case that it is sufficient to provide the optical amplifying apparatus only at one of those locations.

In the OADM having the above configuration, the optical amplifying part 11 having the input light controlling part 10 can keep the optical power of input light approximately constant. Therefore, the optical amplifying part 11 has an amplification characteristic in which variations in gain, noise figure, etc. are inhibited in spite of increase or decrease in the number of channels.

In particular, where the OADM is provided upstream of the dropping part 12, the optical power of input light of the optical amplifying part 11 can be kept approximately constant even if the number of channels decreases in an OADM located upstream of the OADM concerned. Where the OADM is provided between the dropping part 12 and the adding part 13, the optical power of input light of the optical amplifying part 11 can be kept approximately constant even if an arbitrary number of optical signals (channels) are dropped by the dropping part 12 of the OADM. Where the OADM is provided downstream of the adding part 13, the optical power of input light of the optical amplifying part 11 can be kept approximately constant even if an arbitrary number of optical signals (channels) are added to a WDM optical signal that passes through the OADM by the adding part 13 of the OADM.

As shown in FIG. 2, the OADM may further be provided, between the dropping part 12 and the adding part 13, with an optical power adjusting part 29 for adjusting the optical power of light to be input to the adding part 13.

In this configuration, the optical power of an optical signal of each channel that passes through the OADM is made approximately equal by the optical power adjusting part 29 to that of an optical signal of each channel that is added by the OADM. Therefore, the input light controlling part 10-3 that is connected to the third optical amplifying part 11-3 is allowed to adjust the optical power of probe light in consideration of only a decrease in the number of channels of a WDM optical signal.

Embodiment 2
(Configuration)

A second embodiment relates to an OADM.

The OADM according to the second embodiment is connected to an optical transmission system that transmits a 32-wave WDM optical signal between two end stations. A plurality of nodes is connected between the two end stations. One node is a repeater apparatus for amplifying a WDM optical signal, and another node is an OADM for dropping and adding an optical signal of a certain channel from and to a WDM optical signal and passes optical signals of prescribed channels of the WDM optical signal. Another OADM is connected between the OADM according to the second embodiment and a sending end station for generating and sending a WDM optical signal.

Figure 3:
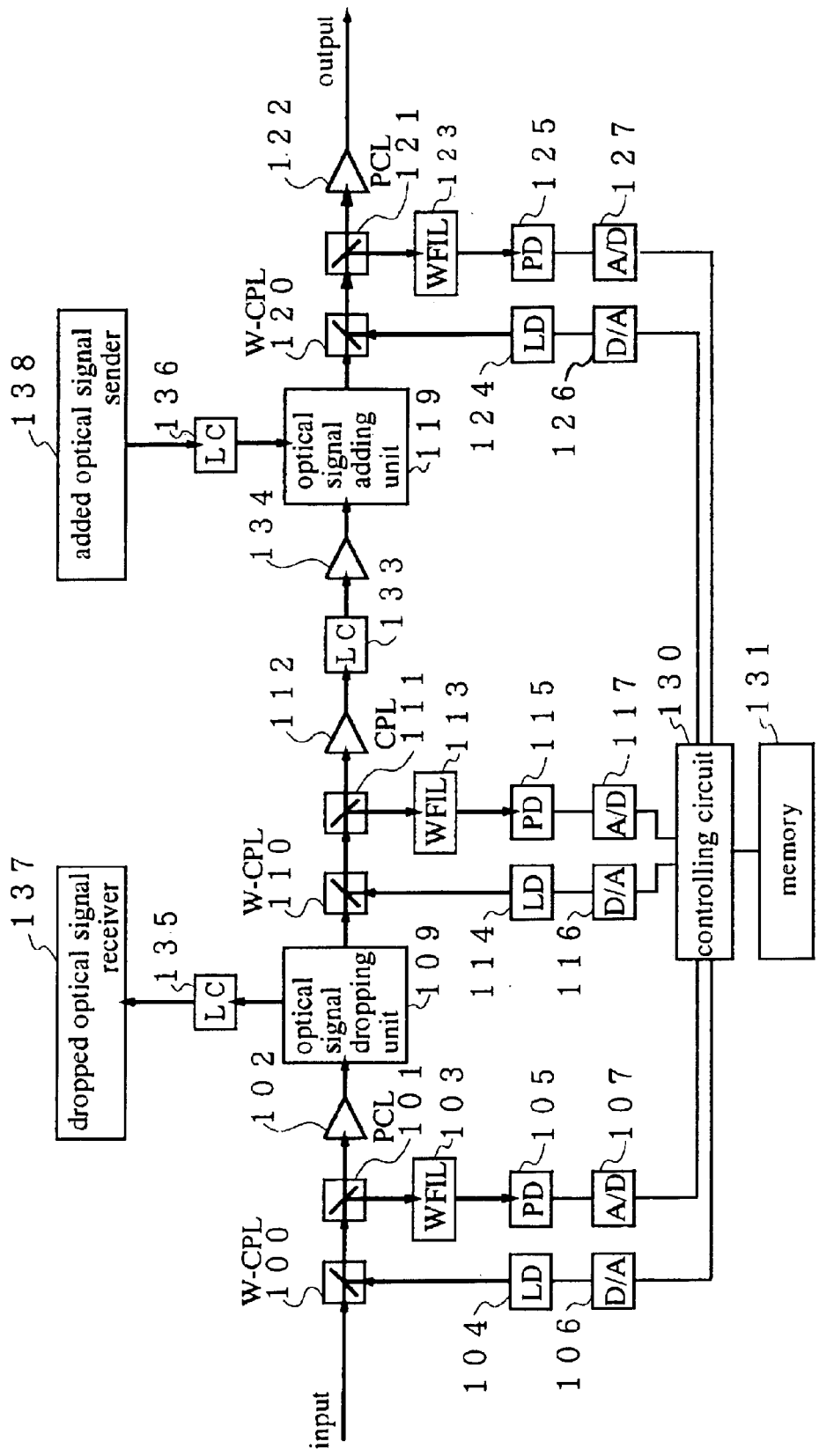
FIG. 3 shows a block diagram of the composition of an OADM according to a second embodiment of the invention.

Referring to FIG. 3, a semiconductor laser (hereinafter abbreviated as LD) 104 in the OADM emits laser light having a prescribed wavelength. This laser light is probe light that serves to keep the optical power of input light of an optical amplifier 102 constant in spite of increase or decrease in the number of channels of a WDM optical signal.

Although the prescribed wavelength may be set in a gain wavelength band (range b) where a WDM optical signal is amplified in the gain-wavelength characteristic of the optical amplifier 102 (see FIG. 4), in this embodiment it is set in one of ranges excluding range b to avoid crosstalk that would otherwise occur between a WDM optical signal and probe light. That is, the wavelength of probe light is set in parts, excluding range b, of range B where the gain-wavelength characteristic curve of the optical amplifier 102 is approximately flat, for example, at wavelength Y1 (see FIG. 4).

Probe light output of the LD 104 is input to an optical multi/demultiplexer 100 (hereinafter will be abbreviated to W-CPL).

The W-CPL 100 wavelength-multiplexes the probe light with a WDM optical signal to be input to the OADM.

The WDM optical signal with which the probe light has been wavelength-multiplexed is input to an optical coupler (hereinafter abbreviated as CPL) 101 for branching input light into two parts. For example, the CPL 101 can be a minute optical device type optical coupler such as a half mirror, a fiber type optical coupler such as a fiber fused coupler, or a guided-wave type optical coupler.

One part separated by the CPL 101 is input to the optical amplifier 102. In consideration of future increase in the number of channels, the optical amplifier 102 has ability of amplifying a WDM optical signals of up to 64 channels, for example, at a prescribed gain.

The other part separated by the CPL 101 is input to a weighting filter (hereinafter will be abbreviated to WFIL) 103.

The transmittance-wavelength characteristic of the weighting filter 103 is determined in the following manner.

The degree of gain saturation is determined to be a desired one and optical power values of probe light at respective wavelengths that satisfy the degree of gain saturation are measured. The measured optical power values of probe light are converted by using, as a reference, an optical power value of probe light that is necessary when the wavelength of the probe light is set at the central wavelength in the gain wavelength band (range B) of the optical amplifier 102. Based on the converted optical power values, the transmittance-wavelength characteristic of the WFIL 103 is determined so that the optical power of probe light that has passed through the WFIL 103 is kept approximately the same even if the wavelength of the probe light deviates.

For example, the WFIL 103 can be a dielectric multilayer optical filter or a fiber grating filter (hereinafter will be abbreviated to FBG).

The WDM optical signal associated with the probe light that is output of the WFIL 103 is input to a photodiode (hereinafter will be abbreviated to PD) 105 which outputs a current corresponding to the optical power of received light. Other PDs to be described later have a similar function of outputting a current corresponding to the optical power of received light. An output of the PD 105 is input to an A/D converter (hereinafter abbreviated as A/D) 107 for converting an analog signal into a digital signal. Other A/D's to be described later similarly convert an analog signal into a digital signal. An output of the A/D 107 is input to a controlling circuit 130.

The controlling circuit 130 compares the output value of the A/D 107 with a reference value and outputs a digital signal to adjust the output of the LD 104 so that the output value of the A/D 107 becomes equal to the reference value. The digital signal is converted into an analog signal by a D/A converter (hereinafter abbreviated as D/A) 106 for converting a digital signal into an analog signal. The resulting analog signal is input to the LD 104. Other D/A's to be described later similarly convert a digital signal into an analog signal.

The driving current of the LD 104 is adjusted based on the analog signal, whereby the optical power of output laser light, that is, probe light, is adjusted. As a result of this adjustment of the probe light, the optical power of input light of the optical amplifier 102 is kept approximately constant in spite of increase or decrease in the number of channels of a WDM optical signal.

The above-mentioned reference value is a value greater than or equal to a value of an output of the PD 105 that is produced when the number of channels of a WDM optical signal is 32, for example, a value that is produced when the number of channels of a WDM optical signal is 35. The reference value is stored in a memory 131, and is a value of an output of the memory 131 to the controlling circuit 130. The memory 131 stores a correspondence table between the maximum operable multiplex number and the reference value. For example, the correspondence table includes reference values for respective maximum operable multiplex numbers that deviate from each other by 16, such as reference values for maximum operable multiplex numbers 16, 32, 48, and 64. The interval between maximum operable multiplex numbers is not limited to 16 and can be set at an arbitrary number such as 4, 8, or 12.

On the other hand, the probe light and the WDM optical signal amplified by the optical amplifier 102 are input to an optical signal dropping unit 109. The optical signal dropping unit 109 drops an optical signal (channel) that should be dropped in the OADM from the WDM optical signal to a dropped optical signal receiver 137 via a loss component (hereinafter will be abbreviated to LC) 135, and outputs only a WDM optical signal in which only non-dropped optical signals (channels) are multiplexed with each other to a W-CPL 110.

For example, the optical signal dropping unit 109 can be an acousto-optic tunable filter (hereinafter abbreviated as AOTF). The AOTF is an acousto-optic filter which separates and selects part of incident light by diffraction by utilizing a refractive index variation in an optical waveguide that is caused by the acousto-optic effect. The AOTF drops one part of incident light, that is, a separated and selected optical signal (channel), to the dropped optical signal receiver 137 via the LC 135, and inputs the other part, that is, optical signals (channels) that have not been separated nor selected, to the W-CPL 110. Surface acoustic waves which are ultrasonic waves have the acousto-optic effect. Surface acoustic waves are generated by applying an RF frequency voltage between electrodes formed on a piezoelectric substrate. Therefore, a channel to be separated and selected can be changed by controlling the RF frequency, which may be done by using a control signal of the controlling circuit 130.

The loss component 135 is an optical component with loss of an optical power. The present embodiment will describe a case where a dispersion compensator is used as an example of loss component, however, it is not limited to such a case.

The LC 135 compensates for chromatic dispersion occurring in the WDM optical signal in an optical transmission line between the pre-stage repeater apparatus and the OADM concerned and chromatic dispersion occurring in the WDM optical signal in part of the OADM between the W-CPL 100 and the optical signal dropping unit 109.

An LD 114 emits laser light having a prescribed wavelength. This laser light is probe light that serves to keep the optical power of input light of an optical amplifier 112 constant in spite of increase or decrease in the number of channels of a WDM optical signal. For example, the prescribed wavelength is set at wavelength Y1 shown in FIG. 4.

Probe light that is output of the LD 114 is input to a W-CPL 110.

The W-CPL 110 wavelength-multiplexes the probe light with the WDM optical signal including only the optical signals to pass through the OADM. The WDM optical signal with which the probe light has been wavelength-multiplexed is input to a CPL 111 for branching input light into two parts.

One part separated by the CPL 111 is input to the optical amplifier 112. Like the optical amplifier 102, the optical amplifier 112 has ability of amplifying a WDM optical signal of up to 64 channels, for example, at a prescribed gain.

The other part separated by the CPL 111 is input to a WFIL 113. As in the case of the WFIL 103, the transmittance-wavelength characteristic of the WFIL 113 is determined in accordance with the degree of gain saturation of the optical amplifier 112.

The WDM optical signal associated with the probe light that is output of the WFIL 113 is input to a PD 115. An output of the PD 115 is input to an A/D 117. An output of the A/D 117 is input to the controlling circuit 130.

The controlling circuit 130 compares the output value of the A/D 117 with the reference value that is stored in the memory 131 and outputs a digital signal to adjust the output of the LD 114 so that the output value of the A/D 117 becomes equal to the reference value. The digital signal is converted by a D/A 116 into an analog signal, which is input to the LD 114. The driving current of the LD 114 is adjusted by the analog signal, whereby the optical power of output laser light, that is, probe light, is adjusted.

On the other hand, the probe light and the WDM optical signal that have been amplified by the optical amplifier 112 are input to an LC 133.

The LC 133 compensates for chromatic dispersion occurring in the WDM optical signal in the optical transmission line between the pre-stage repeater apparatus and the OADM concerned and chromatic dispersion occurring in the WDM optical signal in part of the OADM between the W-CPL 100 and the optical amplifier 112.

An output of the LC 133 is amplified by an optical amplifier 134. Since the input of the optical amplifier 112 is controlled so as to be kept approximately constant, the output of the optical amplifier 112 and the loss in the LC 133 are also kept approximately constant. Therefore, the input of the optical amplifier 134 is also kept approximately constant, which dispenses with an input light controlling apparatus according to the invention.

An output of the optical amplifier 134 is input to an optical signal adding unit 119. Receiving an optical signal (channel) to be added in the OADM from an added optical signal sender 138, the optical signal adding unit 119 wavelength-multiplexes the WDM signal including only the optical signals (channels) to pass through the OADM with the optical signal (channel) to be added and inputs a resulting WDM optical signal to a W-CPL 120. For example, the optical signal adding unit 119 can be a dielectric multilayer optical filter which is a optical multi/demultiplexer or an array waveguide grating.

An output of the optical signal adding unit 119 is input a W-CPL 120.

An LD 124 emits laser light having a prescribed wavelength. This laser light is probe light that serves to keep the optical power of input light of an optical amplifier 122 constant in spite of increase or decrease in the number of channels of a WDM optical signal. For example, the prescribed wavelength is set at wavelength Y1 shown in FIG. 4.

Probe light output of the LD 124 is input to the W-CPL 120.

The W-CPL 120 wavelength-multiplexes the probe light with the WDM optical signal from the optical signal adding unit 119. The WDM optical signal with which the probe light has been wavelength-multiplexed is input to a CPL 121 for branching input light into two parts.

One part separated by the CPL 121 is input to the optical amplifier 122. Like the optical amplifier 102, the optical amplifier 122 has ability of amplifying a WDM optical signal of up to 64 channels, for example, at a prescribed gain.

The other part separated by the CPL 121 is input to a WFIL 123. As in the case of the WFIL 103, the transmittance-wavelength characteristic of the WFIL 123 is determined in accordance with the degree of gain saturation of the optical amplifier 122.

The WDM optical signal associated with the probe light that is output of the WFIL 123 is input to a PD 125. An output of the PD 125 is input to an A/D 127. An output of the A/D 127 is input to the controlling circuit 130.

The controlling circuit 130 compares the output value of the A/D 127 with the reference value that is stored in the memory 131 and outputs a digital signal to adjust the output of the LD 124 so that the output value of the A/D 127 becomes equal to the reference value. The digital signal is converted by a D/A 126 into an analog signal, which is input to the LD 124. The driving current of the LD 124 is adjusted by the analog signal, whereby the optical power of output laser light, that is, probe light, is adjusted.

An output of the CPL 121 is amplified by the optical amplifier 122. An output of the optical amplifier 122 is sent to an optical transmission line, through which the WDM optical signal that is output of the OADM is transmitted to the next node.

The dropped optical signal receiver 137 receives and processes the optical signal (channel) that has been dropped by the optical signal dropping unit 109. For example, the reception and processing are to demodulate the dropped optical signal and thereby extract information from it, and to send the dropped optical signal to another network in a case where the OADM is connected to it.

An example of the dropped optical signal receiver 137 will be described with reference to FIG. 5.

Figure 5:
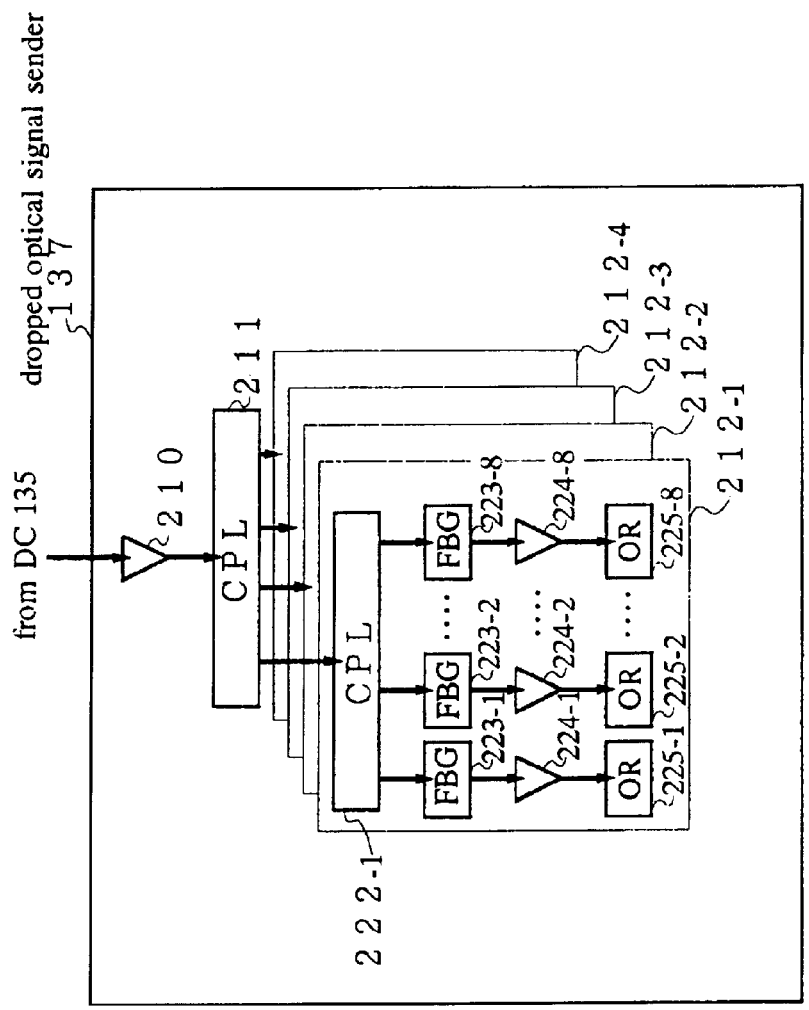
FIG. 5 shows a block diagram of the detailed composition of an example of a dropped optical signal receiver in the OADM according to the second embodiment.

As shown in FIG. 5, a WDM optical signal that is output of the LC 135 is input to an optical amplifier 210 for amplifying a WDM optical signal. An output of the optical amplifier 210 is input to a CPL 211 for branching input light into four parts. The resulting four WDM optical signals are input to respective receiving units 212-1 to 212-4.

Since the receiving units 212-1 to 212-4 are the same in configuration except that the central wavelengths in the transmission wavelength bands of respective FBGs 223 are different from each other, only the receiving unit 212-1 will be described below.

One WDM optical signal separated by the CPL 211 is input to a CPL 222-1 for branching input light into eight parts. Resulting eight optical signals are input to respective FBGs 223-1 to 223-8.

Outputs of the FBGs 223-1 to 223-8 are input to respective optical amplifiers 224-1 to 224-8 and amplified there. Outputs of the optical amplifiers 224-1 to 224-8 are input to respective optical receivers (hereinafter abbreviated as ORs) 225-1 to 225-8 for extracting information by demodulating a received optical signal and subjected to reception processing there.

The FBGs 223-1 to 223-8 are band-pass optical filters for transmitting respective light beams having prescribed wavelengths. The central wavelengths in the transmission wavelength bands of the FBGs 223-1 to 223-8 are set at channel-1 to channel-8 of a WDM optical signal, respectively. For example, the central wavelength in the transmission wavelength band of the FBG 223-1 is set at the wavelength of channel-1 of a WDM optical signal and the central wavelength in the transmission wavelength band of the FBG 223-2 is set at the wavelength of channel-2 of a WDM optical signal. Therefore, the ORs 225-1 to 225-8 perform reception processing on optical signals of channel-1 to channel-8 of a WDM optical signal, respectively.

Having the same configuration as the receiving unit 212-1 and different central wavelengths in the transmission wavelength bands of the RBGs 223 than in the receiving unit 212-1, the receiving unit 212-2 performs reception processing on optical signals of channel-9 to channel-16, the receiving unit 212-3 performs reception processing on optical signals of channel-17 to channel-24, and the receiving unit 212-4 performs reception processing on optical signals of channel-25 to channel-32.

When the number of channels of a WDM optical signal is increased, another receiving unit 212 may be added and the branching number of the CPL 211 may be changed accordingly.

In the dropped optical signal receiver 137 having the above configuration, reception processing can be performed on an optical signal (channel) dropped by the OADM by making a corresponding OR 225 operational.

On the other hand, the added optical signal sender 138 generates an optical signal of a certain channel to be added in the OADM. Although the channels of optical signals to be generated by the added optical signal sender 138 need to be the same as ones of the channels of optical signals dropped by the optical signal dropping unit 137, the number of channels of optical signals to be generated need not be equal to the number of channels of dropped optical signals and may be less than or equal to the latter. For example, when the channels of optical signals dropped by the optical signal dropping unit 137 are channel-2, channel-3, and channel-5, an optical signal of only channel-2 may be added or optical signals of channel-2, channel-3, and channel-5 may be added.

An example of the added optical signal sender 138 will be described below with reference to FIG. 6.

Figure 6:
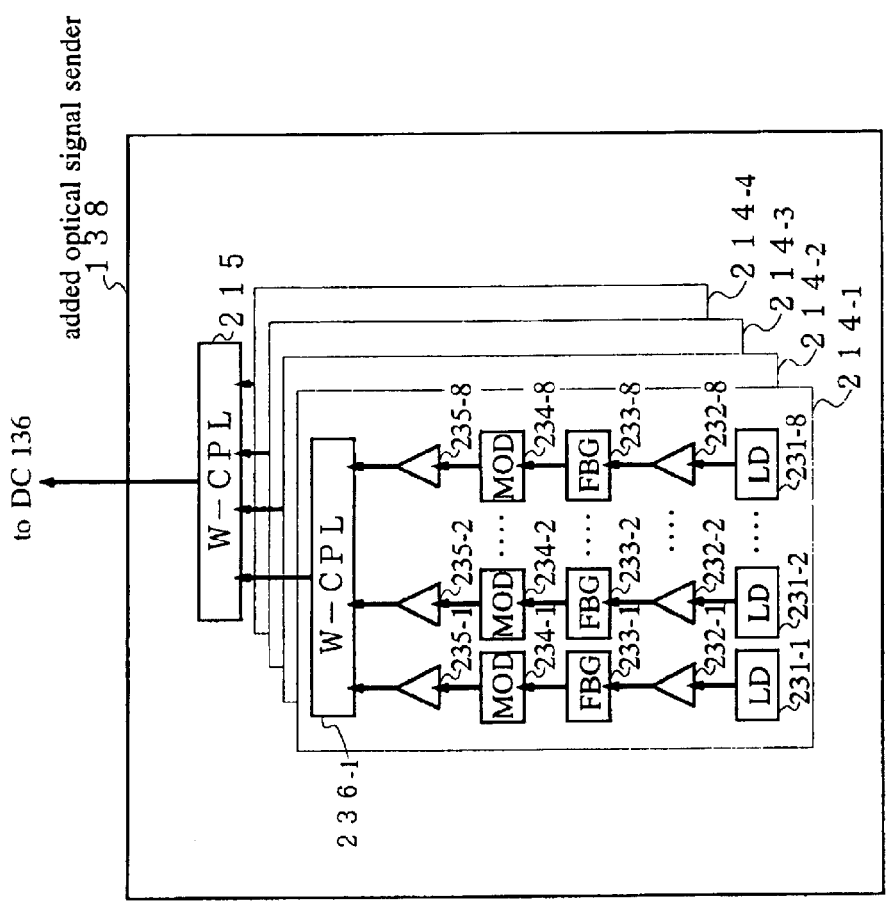
FIG. 6 shows a block diagram of the detailed composition of an example of an added optical signal sender in the OADM according to the second embodiment.

In FIG. 6, an LD 231-1 in a sending unit 214-1 emits laser light of a wavelength corresponding to channel-1. The laser light is amplified by an optical amplifier 232-1 and then input to an FBG 233-1. The central wavelength in the transmission wavelength band of the FBG 233-1 is set at the wavelength of channel-1 of a WDM optical signal. With this setting, laser light output of the FBG 233-1 can correctly be given the wavelength of channel-1.

An output of the FBG 233-1 is input to and modulated by an optical modulator (hereinafter abbreviated as MOD) for modulating laser light with information to be sent. An output of the MOD 234-1 is input to an optical amplifier 235-1 and amplified there. For example, the MOD 234-1 can be an external modulation type modulator such as a Mach-Zehnder interferometer type optical modulator or a semiconductor electric field absorption type optical modulator.

The sending unit 214-1 is provided with a total of eight sets of the LD 231, the optical amplifier 232, the FGB 233, the MOD 234, and the optical amplifier 235. Outputs of the respective optical amplifiers 235-1 to 235-8 are input to a W-CPL 236-1 in the sending unit 214-1 and wavelength-multiplexed with each other there. In the respective sets, the LDs 231-1 to 231-8 oscillate at wavelengths corresponding to channal-1 to channel-8 of a WDM optical signal, respectively, and the central wavelengths in the transmission wavelength bands of the FGBs 233-1 to 233-8 are set at the wavelengths corresponding to channal-1 to channel-8 of a WDM optical signal, respectively. Therefore, the sending unit 214-1 can generate optical signals of channel-1 to channel-8.

In addition to the sending unit 214-1, three sending parts 214-2 to 214-4 are provided that are the same in configuration as the sending unit 214-1 except that the oscillation wavelengths of the LDs 231 and the central wavelengths in the transmission wavelength bands of the FBGs 233 are different than in the sending unit 214-1. The sending part 214-2 generates optical signals of channel-9 to channel-16, the sending unit 214-3 generates optical signals of channel-17 to channel-24, and the sending unit 214-4 generates optical signals of channel-25 to channel-32.

Outputs of the respective sending parts 214-1 to 214-4 are input to a W-CPL 215 for wavelength-multiplexing input light beams with each other, and an output of the W-CPL 215 is input to the LC 136.

The added optical signal sender 138 having the above configuration can generate an optical signal of a desired channel by making operational an MOD 234 corresponding to the channel of an optical signal to be added in the OADM.

Examples of each of the optical amplifiers 102, 112, and 122 will be described below with reference to FIGS. 7A and 7B.

Referring to FIG. 7A, input light is input to a CPL 254, where it is branched into two parts. One part separated by the CPL 254 is input to a PD 255. An output of the PD 255 is input to an A/D 256 and converted into a digital signal there. An output of the A/D 256 is input to a gain/output controlling circuit 261. On the other hand, the other part separated by the CPL 254 is input to a CPL 252.

The CPL 252 combines laser light generated by an LD 251 with the output of the CPL 254. Combined light is input to an optical fiber that is doped with erbium element as a rare-earth element (hereinafter will be abbreviated to EFD) 253. Erbium element is one of the lanthanoid rare-earth elements and has the element symbol Er and the atomic number 68. The lanthanoid elements have similar properties.

When electrons of erbium are excited by pump light that is supplied from the LD 251, population inversion is formed in the EDF 253. If the EDF 253 receives input light in this state, the EDF 253 amplifies the input light through stimulated emission.

An output of the EDF 253 is input to a CPL 258, where it is branched into two parts. One part separated by the CPL 258 is output as amplified output light. The other part separated by the CPL 258 is input to a PD 259. An output of the PD 259 is input to an A/D 260 and converted into a digital signal there. An output of the A/D is input to the gain/output controlling circuit 261.

The gain/output controlling circuit 261 receives the outputs of the A/D's 256 and 260, and controls the gain or output so that it is kept constant by comparing the output values. The gain/output controlling circuit 261 adjusts the oscillation wavelength and the optical power of laser light emitted from the LD 251 by outputting a signal to the LD 251 via a D/A 257 so as to attain a prescribed gain or output. The oscillation wavelength and the optical power of laser light emitted from the LD 251 are adjusted by adjusting the device temperature and the driving current of the LD 251.

Where a sufficient gain cannot be obtained by the one-stage configuration of the optical fiber amplifier shown in FIG. 7A, a plurality of optical fiber amplifiers of FIG. 7A are connected to each other in cascade as shown in FIG. 7B to obtain a sufficient gain. FIG. 7B shows a case where two optical fiber amplifiers of FIG. 7A are connected to each other in cascade.

Where a plurality of optical fiber amplifiers are connected to each other in cascade as in the case of FIG. 7B and an input light controlling apparatus according to the invention is connected to the input of the first-stage optical fiber amplifier, the optical powers of input light beams of the second-stage and subsequent optical fiber amplifiers are made approximately constant. This provides an advantage that no input light controlling apparatus is needed for the second-stage and subsequent optical fiber amplifiers.

(Operation and Advantageous Effects in the Second Embodiment)

Next, the operation and the advantageous effects of the OADM according to the second embodiment will be described.

Now, it is assumed that an optical transmission system to which the OADM concerned is connected transmits a WDM optical signal whose maximum operable multiplex number is 32. In this case, when the OADM is connected to the optical transmission system, as initial setting, reference values corresponding to a maximum operable multiplex number of 32 are selected from the correspondence table between the maximum operable multiplex number and the reference values that is stored in the memory 131. It is assumed that the reference values are values of outputs of the PDs 105, 115, and 125 that are produced when a 35-wave WDM optical signal is received by the PDs 105, 115, and 125, respectively.

If a 32-wave WDM optical signal is input from the pre-stage OADM to the OADM concerned under the above circumstances, a value of the output of the PD 105 is smaller than the reference value by a value corresponding to three waves. Therefore, the controlling circuit 130 outputs a signal that instructs to compensate for three waves to the LD 104 via the D/A 106. The LD 104 outputs probe light for three waves to the W-CPL 100 by increasing the driving current based on the received signal.

The W-CPL 100 wavelength-multiplexes the 32-wave WDM optical signal that is supplied from the pre-stage OADM with the probe light for three waves, and inputs a resulting WDM optical signal to the optical amplifier 102 via the CPL 101.

If no reference values corresponding to respective maximum operable multiplex numbers were given to the memory 131, probe light would have optical power for 64 waves because the optical amplifier 102 has ability of amplifying a 64-wave WDM optical signal. In contrast, the OADM according to the second embodiment can avoid consuming useless energy in the LD 104 because the optical power of probe light is adjusted in the above manner based on a reference value corresponding to a maximum operable multiplex number.

Further, even if the oscillation wavelength of the LD 104 deviates owing to a variation in driving current, the deviation is compensated for by the WFIL 103. Therefore, the controlling circuit 130 can judge optimum optical power of probe light based on the output of the PD 105.

The 32-wave WDM optical signal amplified by the optical amplifier 102 is input to the optical signal dropping unit 109. For example, the optical signal dropping unit 109 of the OADM drops optical signals of five channels to the dropped optical signal receiver 137 via the LC 135. As a result, an output of the optical signal dropping unit 109 is a 27-wave WDM optical signal.

Part of the 27-wave WDM optical signal is input to the PD 115 via the W-CPL 110, the CPL 111, and the WFIL 113.

The value of output of the PD 115 is smaller than the reference value by a value corresponding to eight waves. Therefore, the controlling circuit 130 outputs a signal that instructs to compensate for eight waves to the LD 114 via the D/A 116. The LD 114 outputs probe light for eight waves to the W-CPL 110 by increasing the driving current based on the received signal.

The W-CPL 110 wavelength-multiplexes the 27-wave WDM optical signal that is supplied from the optical signal dropping unit 109 with the probe light for eight waves, and inputs a resulting WDM optical signal to the optical amplifier 112 via the CPL 111. As a result, optical power of 35 waves is input to the optical amplifier 112 irrespective of the number of channels of optical signals that are dropped by the optical signal dropping unit 109. Therefore, the optical amplifier 112 can operate stably.

If probe light generated by the LD 104 is not attenuated sufficiently by the optical signal dropping unit 109, the W-CPL 110, etc., it is also received by the PD 115. However, since the controlling circuit 130 adjusts the output of the LD 114 in accordance with the difference between a value of the output of the PD 115 and the reference value, the output of the LD 114 is adjusted also in consideration of the optical power of the residual probe light. The residual probe light is reused as probe light for the optical amplifier 112.

The 27-wave WDM optical signal amplified by the optical amplifier 112 is input to the optical amplifier 134 via the LC 133. At this time, since the output of the optical amplifier 112 is equal to an amplified output corresponding to 35 waves irrespective of the number of channels of optical signals that are input to the optical amplifier 112, the optical power input to the optical amplifier 134 via the LC 133 is kept approximately constant. Therefore, no input light controlling apparatus according to the invention is needed for the optical amplifier 134.

The 27-wave WDM optical signal amplified by the optical amplifier 134 is input to the optical signal adding unit 119.

If optical signals of two channels are supplied from the added optical signal sender 138 via the LC 136, a 29-wave WDM optical signal is produced and output of the optical signal adding unit 119.

The 29-wave WDM optical signal is input to the PD 125 via the W-CPL 120, the CPL 121, and the WFIL 123.

Since a value of the output of the PD 125 is smaller than the reference value by a value corresponding to six waves, the controlling circuit 130 outputs a signal that instructs to compensate for six waves to the LD 124 via the D/A 126. The LD 124 outputs probe light for six waves to the W-CPL 120 by increasing the driving current based on the received signal.

The W-CPL 120 wavelength-multiplexes the 29-wave WDM optical signal that is supplied from the optical signal adding unit 119 with the probe light for six waves, and inputs optical power corresponding to 35 waves to the optical amplifier 122 via the CPL 121.

On the other hand if optical signals of four channels are supplied from the added optical signal sender 138 via the LC 136, a 31-wave WDM optical signal is produced and output of the optical signal adding unit 119.

The 31-wave WDM optical signal is input to the PD 125 via the W-CPL 120, the CPL 121, and the WFIL 123.

Since a value of the output of the PD 125 is smaller than the reference value by a value corresponding to four waves, the controlling circuit 130 outputs a signal that instructs to compensate for four waves to the LD 124 via the D/A 126. The LD 124 outputs probe light for four waves to the W-CPL 120 by increasing the driving current based on the received signal.

The W-CPL 120 wavelength-multiplexes the 31-wave WDM optical signal that is supplied from the optical signal adding unit 119 with the probe light for four waves, and inputs optical power corresponding to 35 waves to the optical amplifier 122 via the CPL 121.

As described above, optical power corresponding to 35 waves is input to the optical amplifier 122 irrespective of the number of channels of optical signals that are added by the optical signal adding unit 119. Therefore, the optical amplifier 122 can operate stably.

On the other hand, when a 25-wave WDM optical signal is input to the OADM concerned as a result of dropping and adding optical signals (channels) in the pre-stage OADM, since the output of the PD 105 is smaller than the reference value by a value corresponding to 10 waves, the controlling circuit 130 outputs a signal that instructs to compensate for 10 waves to the LD 104 via the D/A 106. The LD 104 outputs probe light for 10 waves to the W-CPL 100 by increasing the driving current based on the received signal.

The W-CPL 100 wavelength-multiplexes the 25-wave WDM optical signal that is supplied from the pre-stage OADM with the probe light for 10 waves, and inputs a resulting WDM optical signal to the optical amplifier 102 via the CPL 101.

As a result, optical power of 35 waves is input to the optical amplifier 102 irrespective of the number of channels of optical signals that is changed by dropping and adding in the pre-stage OADM. Therefore, the optical amplifier 102 can operate stably.

Where a 64-wave WDM optical signal is transmitted through this optical transmission system because of increase in communication capacity, reference values corresponding to a maximum operable multiplex number of 64 may be selected from the correspondence table between the maximum operable multiplex number and the reference values that is stored in the memory 131. The selection may be performed manually by a user. Alternatively, the selection may be performed from an end station by using a control line to which one channel of a WDM optical signal is assigned. As a further alternative, for example, an undefined region of a section over head that accommodates information that is necessary for operation of an optical transmission system such as maintenance information between transmission apparatuses and a status monitor in an SDH (synchronous digital hierarchy) may be used.

Embodiment 3

(Configuration)

A third embodiment relates to an OADM.

The third embodiment is mainly different from the second embodiment in that it is provided with an optical variable attenuator (hereinafter will be abbreviated to VAT) for adjusting the optical power of probe light between the LD 104 and the W-CPL 100, between the LD 114 and the W-CPL 110, and between the LD 124 and the W-CPL 120, and that it is provided, between the optical amplifier 112 and the LC 133, with an optical device for adjusting the optical power of each channel of a WDM optical signal to pass through the OADM and the optical power of an optical signal to be added.

The OADM according to the third embodiment is connected to an optical transmission system that is similar to the one in the second embodiment, and another OADM is connected between the OADM according to the third embodiment and a sending end station that generates a WDM optical signal.

Figure 8:
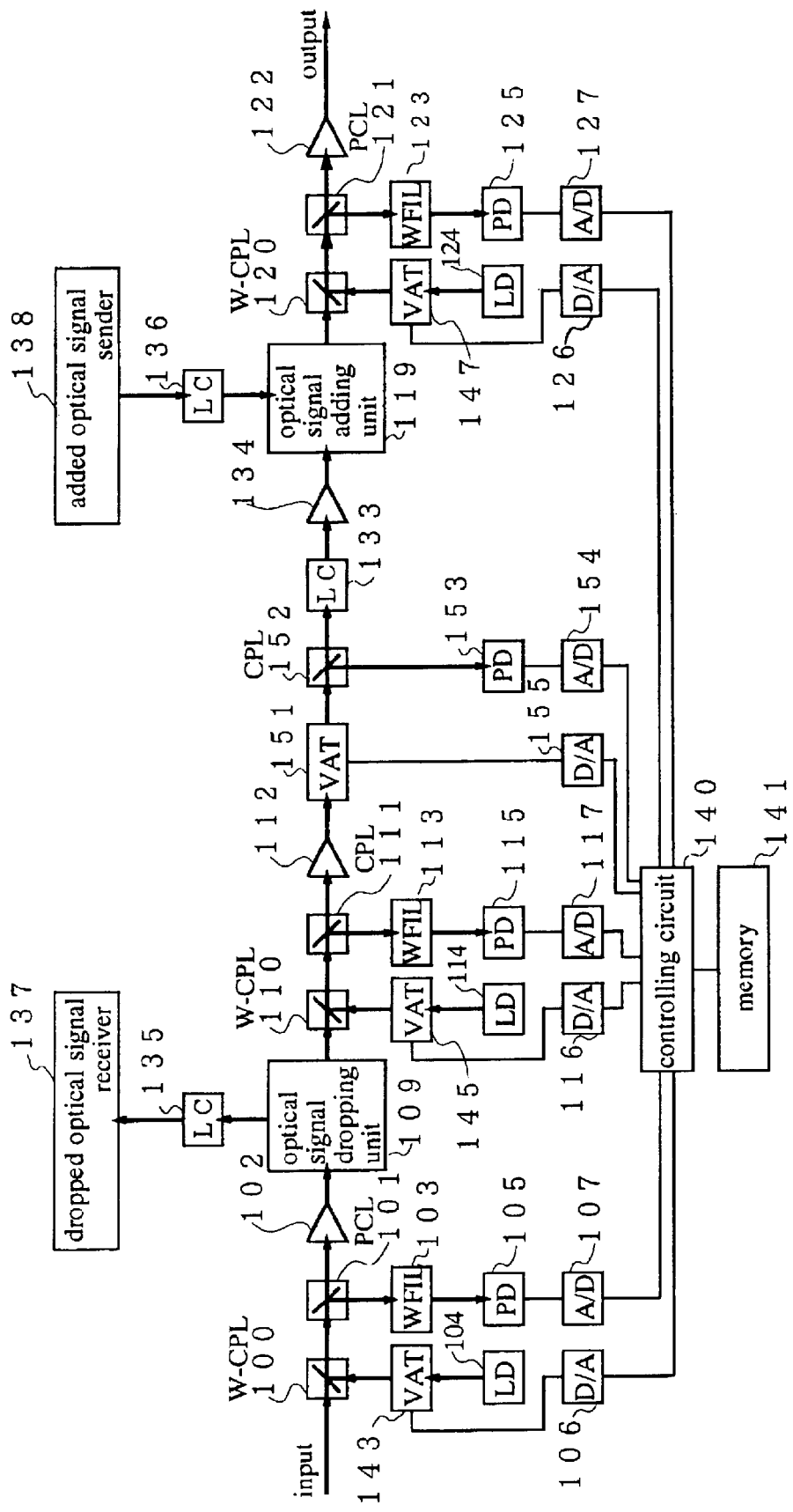
FIG. 8 shows a block diagram of the composition of an OADM according to a third embodiment of the invention.

Referring to FIG. 8, laser light that is emitted from the LD 104 is input to a VAT 143 for attenuating the optical power of input light and outputting resulting light.

Figure 4:
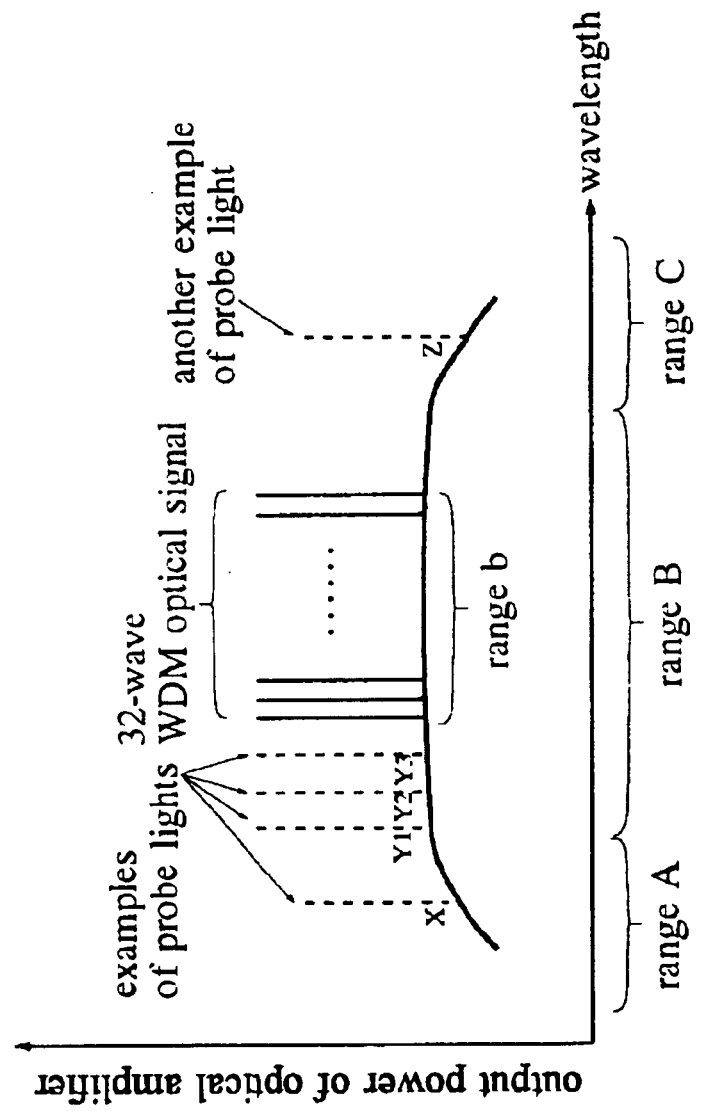
FIG. 4 is a graph showing a relationship between a gain-wavelength characteristic of an optical amplifier and the wavelength of probe light.

To prevent probe light from being amplified by the optical amplifier 102, it is preferable that the wavelength of the laser light be set in a range where the gain in the gain-wavelength characteristic of the optical amplifier 102 is small as shown in FIG. 4 (e.g., range A or C in FIG. 4). In the third embodiment, the wavelength of the LD 104 is set at X in range A. When the wavelength of probe light is set at a wavelength where the gain is small, probe light is not amplified sufficiently by the optical amplifier 102. Therefore, the optical power of the probe light is attenuated by the optical devices downstream of the optical amplifier 102 and finally becomes negligible with respect to the optical power of an optical signal of each channel of a WDM optical signal. The oscillation wavelengths of the LDs 114 and 124 are set in the same manner.

The VAT 143 is an optical device for attenuating input light, the attenuation amount being variable. The same applies to the other VATs to be described later. For example, the VAT can be an optical variable attenuator in which an attenuation disc having a surface on which a metal film whose thickness is varied in the circumferential direction is evaporated is inserted between input light and output light and the attenuation amount is adjusted by rotating the attenuation disc, or an optical variable attenuator in which a magneto-optic crystal and a polarizer (located on the output side of the magneto-optic crystal) are inserted between input light and output light and the attenuation amount is adjusted by changing the strength of a magnetic field applied to the magneto-optic crystal.

An output of the VAT 143 is input to the W-CPL 100. The W-CPL 100 wavelength-multiplexes probe light that is output of the VAT 143 with a WDM optical signal to be input to the OADM.

An output of the W-CPL 100 is input to the CPL 101, where it is branched into two parts. One part separated by the CPL 101 is input to the optical amplifier 102. The other part is input to the PD 105 via the WFIL 103. An output of the PD 105 is input to a controlling circuit 140 via the A/D 107.

The controlling circuit 140 compares an output value of the A/D 107 with the reference value and outputs a digital signal to adjust the attenuation amount of the VAT 143 so that the output value of the A/D 107 becomes equal to the reference value. The digital signal is input to the VAT 143 via the D/A 106.

The attenuation amount of the VAT 143 is adjusted based on an analog signal that is output of the D/A 106, and the VAT 143 adjusts the optical power of laser light received from the LD 104 and outputs resulting laser light. The optical power of probe light is adjusted in this manner. As a result of the adjustment of the probe light, the optical power of input light of the optical amplifier 102 is kept approximately constant in spite of increase or decrease in the number of channels of a WDM optical signal.

The probe light and the WDM optical signal amplified by the optical amplifier 102 are input to the optical signal dropping unit 109. An optical signal (channel) that should be dropped in the OADM is dropped by the optical signal dropping unit 109 to the dropped optical signal receiver 137 via the LC 135. A WDM optical signal in which only non-dropped optical signals (channels) are multiplexed with each other is input to the W-CPL 110.

Laser light emitted from the LD 114 is input to the W-CPL 110 via a VAT 145. The optical coupler 110 wavelength-multiplexes the probe light output of the VAT 145 with the WDM optical signal output of the optical signal dropping unit 109.

An output of the W-CPL 110 is input to the CPL 111, where it is branched into two parts. One part separated by the CPL 111 is input to the optical amplifier 112. The other part is input to the PD 115 via the WFIL 113. An output of the PD 115 is input to a controlling circuit 140 via the A/D 117.

The controlling circuit 140 compares an output value of the A/D 117 with the reference value and outputs a digital signal to adjust the attenuation amount of the VAT 145 so that the output value of the A/D 117 becomes equal to the reference value. The digital signal is input to the VAT 145 via the D/A 116.

The attenuation amount of the VAT 145 is adjusted based on an analog signal that is output of the D/A 116, and the VAT 145 adjusts the optical power of laser light received from the LD 114 and outputs resulting laser light. The optical power of probe light is adjusted in this manner.

The probe light and the WDM optical signal amplified by the optical amplifier 112 are input to a VAT 151. An output of the VAT 151 is input to a CPL 152 for branching input light into two parts. One part separated by the CPL 152 is input to the optical signal adding unit 119 via the LC 133. The other part is input to a PD 153. An output of the PD 153 is input to an A/D 154. An output of the A/D 154 is input to the controlling circuit 140.

The controlling circuit 140 compares an output value of the A/D 154 with a transmission optical signal reference value that is stored in a memory 141, and outputs a digital signal to adjust the output of the VAT 151 so that the output value of the A/D 154 becomes equal to the transmission optical signal reference value. The memory 141 stores the transmission optical signal reference value and reference values that are used in adjusting the attenuation amounts of the respective VATs 143, 145, and 147.

The digital signal is converted by a D/A 155 into an analog signal, which is input to the VAT 151. The attenuation amount of the VAT 151 is adjusted based on the analog signal. The VAT 151 adjusts the optical power of each channel of the WDM optical signal that includes only optical signals (channels) to pass through the OADM.

The transmission optical signal reference value is determined so that the optical power of an optical signal generated by the added optical signal sender 138, in the input side of the optical signal adding unit 119 becomes equal to the optical power of each channel of the WDM optical signal including only optical signals (channels) to pass through the OADM, in the input side of the optical signal adding unit 119.

The optical signal adding unit 119 wavelength-multiplexes an optical signal that is output of the added optical signal sender 138 and received via the LC 136 with the WDM optical signal including only optical signals (channels) to pass through the OADM. An output of the optical signal adding unit 119 is input to the W-CPL 120.

Laser light that is emitted from the LD 124 is input to the W-CPL 120 via a VAT 147. The W-CPL 120 wavelength-multiplexes the probe light that is output of the VAT 147 with the WDM optical signal that is output of the optical signal adding unit 119.

An output of the W-CPL 120 is input to the CPL 121, where it is branched into two parts. One part separated by the CPL 121 is input to the optical amplifier 122. The other part is input to the PD 125 via the WFIL 123. An output of the PD 125 is input to a controlling circuit 140 via the A/D 127.

The controlling circuit 140 compares an output value of the A/D 127 with the reference value and outputs a digital signal to adjust the attenuation amount of the VAT 147 so that the output value of the A/D 127 becomes equal to the reference value. The digital signal is input to the VAT 147 via the D/A 126.

The attenuation amount of the VAT 147 is adjusted based on an analog signal that is output of the D/A 126, and the VAT 147 adjusts the optical power of laser light received from the LD 124 and outputs resulting laser light. The optical power of probe light is adjusted in this manner.

An output of the CPL 121 is amplified by the optical amplifier 122. An output of the optical amplifier 122 is input to an optical transmission line, through which the WDM optical signal that is output of the OADM is transmitted to the next node.

(Operation and Advantageous Effects in the Third Embodiment)

Next, the operation and the advantageous effects of the OADM according to the third embodiment will be described.

In the third embodiment, as in the case of the second embodiment, it is assumed that the maximum operable multiplex number is 32. In initial setting, reference values corresponding to the maximum operable number of 32 are selected from the correspondence table between the maximum operable multiplex number and the reference values that is stored in the memory 141. It is assumed that the reference values are outputs of the PDs 105, 115, and 125 that are produced when a 35-wave WDM optical signal is received by the PDs 105, 115, and 125, respectively.

If a 32-wave WDM optical signal is input from the pre-stage OADM to the OADM concerned under the above circumstances, the output of the PD 105 is smaller than the reference value by a value corresponding to three waves. Therefore, the controlling circuit 140 outputs a signal that instructs to compensate for three waves to the VAT 143 via the D/A 106. The VAT 143 outputs probe light for three waves to the W-CPL 100 by adjusting the attenuation amount based on the received signal.

To cope with a case of a single-wave WDM optical signal, the LD 104 can output optical power for 34 waves or more. The same applies to the LDs 114 and 124.

The W-CPL 100 wavelength-multiplexes the 32-wave WDM optical signal that is supplied from the pre-stage OADM with the probe light for three waves, and inputs a resulting WDM optical signal to the optical amplifier 102 via the CPL 101.

The 32-wave WDM optical signal amplified by the optical amplifier 102 is input to the optical signal dropping unit 109. For example, the optical signal dropping unit 109 of the OADM drops optical signals of ten channels to the dropped optical signal receiver 137 via the LC 135. As a result, an output of the optical signal dropping unit 109 is a 22-wave WDM optical signal.

Part of the 22-wave WDM optical signal, is input to the PD 115 via the W-CPL 110, the CPL 111, and the WFIL 113.

A value of the output of the PD 115 is smaller than the reference value by a value corresponding to thirteen waves. Therefore, the controlling circuit 130 outputs a signal that instructs to compensate for thirteen waves to the VAT 145 via the D/A 116. The VAT 145 outputs probe light for thirteen waves to the W-CPL 110 by adjusting the attenuation amount based on the received signal.

The W-CPL 110 wavelength-multiplexes the 22-wave WDM optical signal that is supplied from the optical signal dropping unit 109 with the probe light for thirteen waves, and inputs a resulting WDM optical signal to the optical amplifier 112 via the CPL 111. As a result, optical power of 35 waves is input to the optical amplifier 112 irrespective of the number of channels of optical signals that are dropped by the optical signal dropping unit 109. Therefore, the optical amplifier 112 can operate stably.

Since the probe light of the LD 104 that has been wavelength-multiplexed with the WDM optical signal is amplified insufficiently by the optical amplifier 102 as shown in FIG. 4 in contrast to the WDM optical signal, it is attenuated sufficiently as it passes through the optical signal dropping unit 109, the W-CPL 110, the CPL 111, and the WFIL 113.

Even if the probe light is not attenuated sufficiently, it serves as probe light for the optical amplifier 112.

Part of the 22-wave WDM optical signal amplified by the optical amplifier 112 is input to the PD 153 via the VAT 151 and the CPL 152.

The controlling circuit 140 compares the transmission optical signal reference value that is stored in the memory 141 with an output of the PD 153 that is supplied via the A/D 154, and outputs a signal to the VAT 151 via the D/A 155 to make the optical power of each channel of the WDM optical signal that is output of the optical amplifier 112 approximately equal to the optical power of an optical signal (channel) to be added. The VAT 151 adjusts the optical power of each channel of the WDM optical signal that is output of the optical amplifier 112 by adjusting the attenuation amount based on the received signal.

The adjusted WDM optical signal is input to the optical signal adding unit 119 via the CPL 152 and the LC 133.

If optical signals of three channels are supplied from the added optical signal sender 138 via the LC 136, a 25-wave WDM optical signal is produced and output of the optical signal adding unit 119.

The 25-wave WDM optical signal is input to the PD 125 via the W-CPL 120, the CPL 121, and the WFIL 123.

Since a value of the output of the PD 125 is smaller than the reference value by a value corresponding to ten waves, the controlling circuit 140 outputs a signal that instructs to compensate for ten waves to the VAT 147 via the D/A 126. The VAT 147 outputs probe light for ten waves to the W-CPL 120 by adjusting the attenuation amount based on the received signal.

The W-CPL 120 wavelength-multiplexes the 25-wave WDM optical signal that is supplied from the optical signal adding unit 119 with the probe light for ten waves, and inputs optical power corresponding to 35 waves to the optical amplifier 122 via the CPL 121.

On the other hand if optical signals of eight channels are supplied from the added optical signal sender 138 via the LC 136, a 30-wave WDM optical signal is produced and output of the optical signal adding unit 119.

The 30-wave WDM optical signal is input to the PD 125 via the W-CPL 120, the CPL 121, and the WFIL 123.

Since a value of the output of the PD 125 is smaller than the reference value by a value corresponding to five waves, the controlling circuit 140 outputs a signal that instructs to compensate for five waves to the VAT 147 via the D/A 126. The VAT 147 outputs probe light for five waves to the W-CPL 120 by adjusting the attenuation amount based on the received signal.

The W-CPL 120 wavelength-multiplexes the 30-wave WDM optical signal that is supplied from the optical signal adding unit 119 with the probe light for five waves, and inputs optical power corresponding to 35 waves to the optical amplifier 122 via the CPL 121.

As described above, optical power corresponding to 35 waves is input to the optical amplifier 122 irrespective of the number of channels of optical signals that are added by the optical signal adding unit 119. Therefore, the optical amplifier 122 can operate stably.

On the other hand, if a 15-wave WDM optical signal is input to the OADM concerned as a result of dropping and adding optical signals (channels) in the pre-stage OADM, since the output of the PD 105 is smaller than the reference value by a value corresponding to 20 waves, the controlling circuit 140 outputs a signal that instructs to compensate for 20 waves to the VAT 143 via the D/A 106. The VAT 143 outputs probe light for 20 waves to the W-CPL 100 by adjusting the attenuation amount based on the received signal. The W-CPL 100 wavelength-multiplexes the 15-wave WDM optical signal that is supplied from the pre-stage OADM with the probe light for 20 waves, and inputs a resulting WDM optical signal to the optical amplifier 102 via the CPL 101.

As a result, optical power of 35 waves is input to the optical amplifier 102 irrespective of the number of channels of optical signals that is changed by dropping and adding in the pre-stage OADM. Therefore, the optical amplifier 102 can operate stably.

Embodiment 4
(Configuration)

A fourth embodiment relates to an OADM.

The fourth embodiment is mainly different from the second embodiment in that probe light is composed of three laser beams having different wavelengths and that a photo-detector in each optical amplifier also serves as a detector for measuring the optical power of input light of the photodetector in order to adjust the optical power of probe light.

The OADM according to the fourth embodiment is connected to an optical transmission system that is similar to the one in the second embodiment, and another OADM is connected between the OADM according to the fourth embodiment and a sending end station that generates and sends a WDM optical signal.

Figure 9:
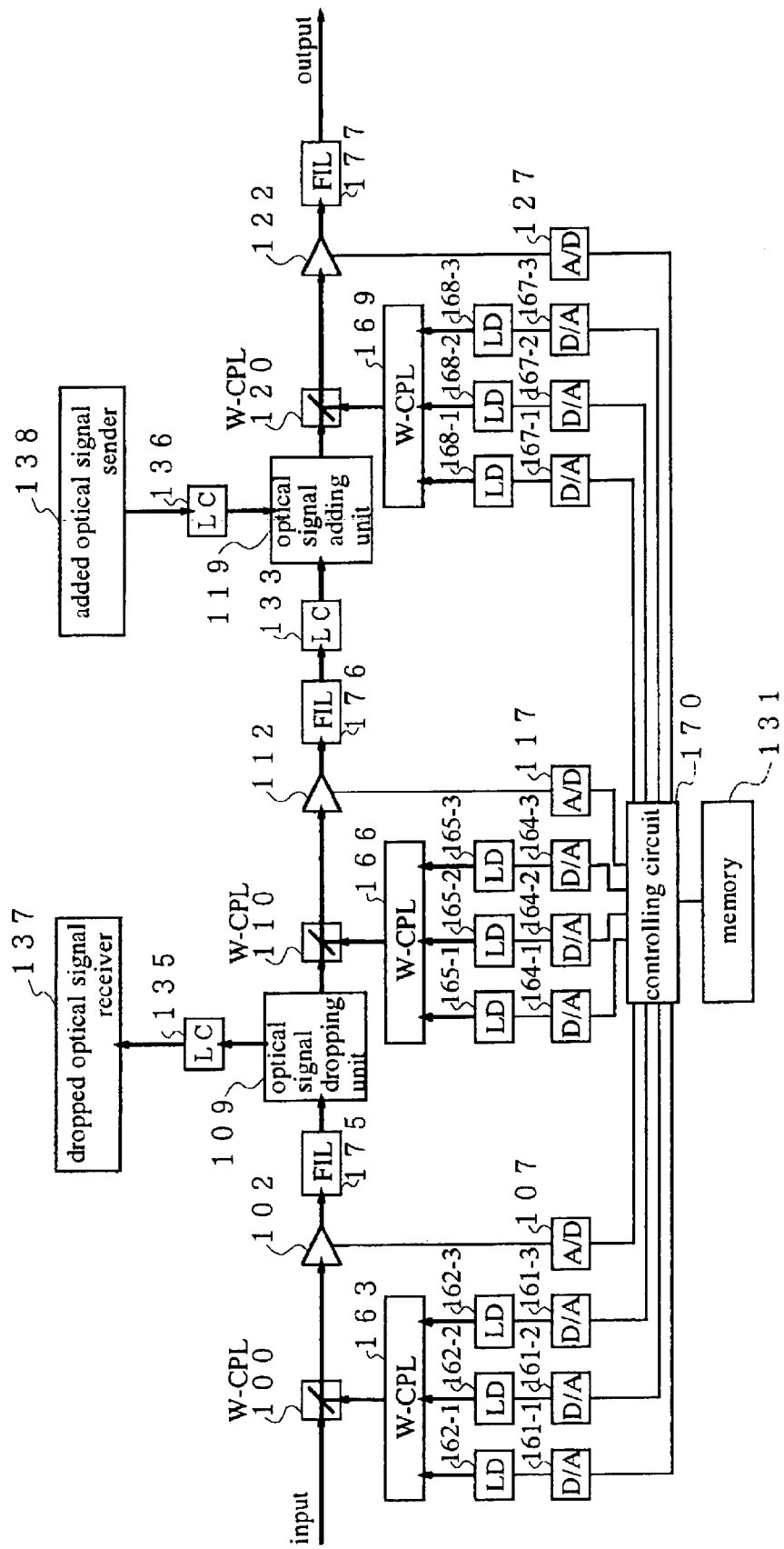
FIG. 9 shows a block diagram of the composition of an OADM according to a fourth embodiment of the invention.
Figure 10:
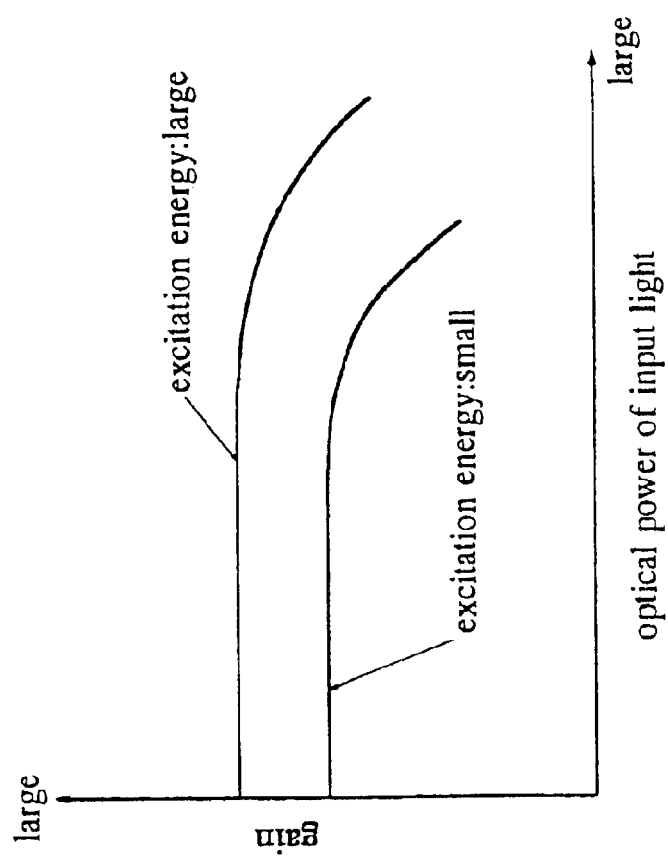
FIG. 10 shows how the gain varies as the optical power of input light varies in a case where the excitation energy for forming population inversion is kept constant.

Referring to FIG. 9, laser beams emitted from three LDs 162-1 to 162-3 having different oscillation wavelengths are input to a W-CPL 163 and wavelength-multiplexed there, and resulting laser light is output of the W-CPL 163. The wavelength-multiplexed laser light is probe light for keeping the optical power of input light of the optical amplifier 102 constant in spite of increase or decrease in the number of channels of a WDM optical signal.

In the gain-wavelength characteristic of the optical amplifier 102, as indicated by broken lines in FIG. 4, the wavelengths of probe light are set on the shorter wavelength side of the smallest operation channel (channel-1) of a WDM optical signal in the gain wavelength band where the gain is approximately constant with respect to the wavelength (indicated by Y1–Y3 in FIG. 4). Alternatively, the wavelengths of probe light may be set on the longer wavelength side of the largest operation channel (channel-32) of a WDM optical signal.

Probe light that is output of the W-CPL 163 is input to the W-CPL 100. The W-CPL 100 wavelength-multiplexes the probe light that is output of the W-CPL 163 with a WDM optical signal to be input to the OADM. An output of the W-CPL 100 is input to the optical amplifier 102.

Figure 7:
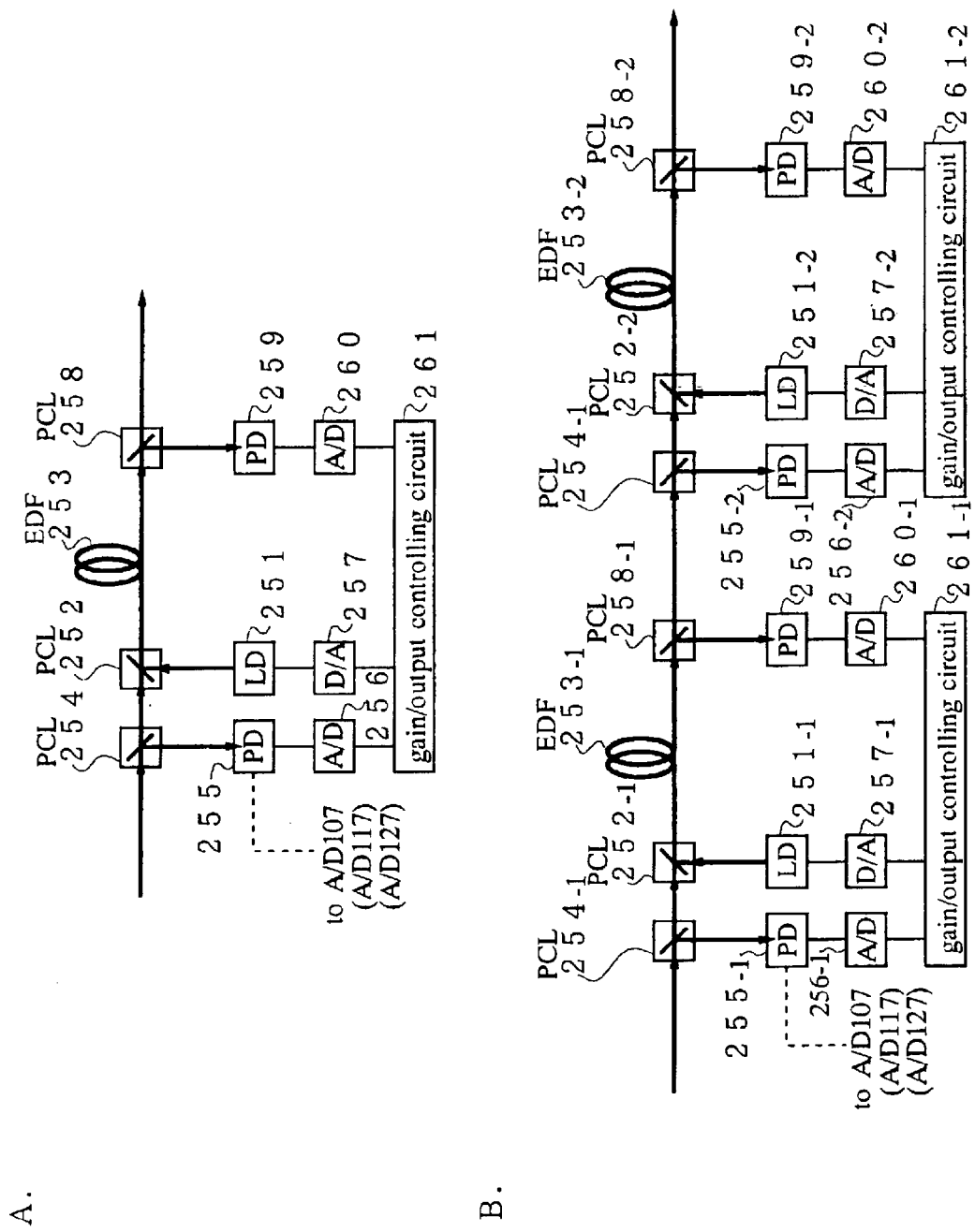
FIGS. 7A and 7B show block diagrams of the detailed composition of examples of an optical amplifier in the OADM according to the second embodiment.

Referring to FIG. 7, an output of the W-CPL 100 is input to the CPL 254 of the optical amplifier 102, where it is branched into two parts. On part separated by the CPL 254 is input to the CPL 252. The other part is input to the PD 255. An output of the PD 255 is not only supplied to the gain/output controlling circuit 261 via the A/D 256 as described in the second embodiment but also supplied to the A/D 107 as indicated by a broken line in FIG. 7. An output of the A/D 107 is input to a controlling circuit 170.

The controlling circuit 170 compares an output value of the A/D 107 with the reference value and outputs digital signals to respective D/A's 161-1 to 161-3 to adjust the outputs of the respective LDs 162-1 to 162-3 so that the output value of the A/D 107 becomes equal to the reference value.

The digital signals are converted by the respective D/A's 161-1 to 161-3 into analog signals, which are input to the respective LDs 162-1 to 162-3.

The driving currents of the respective LDs 162-1 to 162-3 are adjusted based on the received analog signals, whereby their laser light outputs are adjusted. The optical power of probe light is adjusted in this manner. As for increase or decrease of the optical power of probe light, satisfactory results are obtained by increasing or decreasing the optical powers of laser beams emitted from the three LDs 162-1 to 162-3 so that the sum of those optical powers becomes equal to an intended increase or decrease of probe light. For example, since probe light is composed of laser beams emitted from the three LDs 162-1 to 162-3, ⅓ of an intended increase or decrease may be allocated to each of the LDs 162-1 to 162-3.

As a result of the adjustment of probe light, input light of the optical amplifier 102 is kept approximately constant in spite of increase or decrease in the number of channels of a WDM optical signal.

On the other hand, as shown in FIG. 9, the probe light and the WDM optical signal amplified by the optical amplifier 102 are input to an optical filter 175. The optical filter 175 passes the WDM optical signal while rejecting the probe light. That is, the cut-off wavelength of the optical filter 175 is set between the wavelength ranges of the WDM optical signal and the probe light.

The output of the optical filter 175 are input to an optical signal dropping unit 109. The optical signal dropping unit 109 drops an optical signal (channel) that should be dropped in the OADM from the WDM optical signal to a dropped optical signal receiver 137 via an LC 135, and outputs only a WDM optical signal in which only non-dropped optical signals (channels) are multiplexed with each other to a W-CPL 110.

Laser beams emitted from three LDs 165-1 to 165-3 having different oscillation wavelengths are input to a W-CPL 166 and wavelength-multiplexed with each other there, and resulting laser light is output of the W-CPL 166. The wavelength-multiplexed laser light is probe light for keeping the optical power of input light of the optical amplifier 112 constant in spite of increase or decrease in the number of channels of a WDM optical signal.

The prescribed wavelength is set on the wavelength that is similar to the one in the LD 162.

Probe light that is output of the W-CPL 166 is input to the W-CPL 110. The W-CPL 110 wavelength-multiplexes the probe light that is output of the W-CPL 166 with a WDM optical signal to be input to the OADM. An output of the W-CPL 110 is input to the optical amplifier 112.

Referring to FIG. 7, an output of the W-CPL 110 is input to the CPL 254 of the optical amplifier 112, where it is branched into two parts. On part separated by the CPL 254 is input to the CPL 252. The other part is input to the PD 255. An output of the PD 255 is not only supplied to the gain/output controlling circuit 261 but also supplied to the A/D 117 as indicated by a broken line in FIG. 7. An output of the A/D 117 is input to a controlling circuit 170.

The controlling circuit 170 compares an output value of the A/D 117 with the reference value and outputs digital signals to respective D/A's 164-1 to 164-3 to adjust the outputs of the respective LDs 165-1 to 165-3 so that the output value of the A/D 117 becomes equal to the reference value.

The digital signals are converted by the respective D/A's 164-1 to 164-3 into analog signals, which are input to the respective LDs 165-1 to 165-3.

The driving currents of the respective LDs 165-1 to 165-3 are adjusted based on the received analog signals, whereby their laser light outputs are adjusted. The optical power of probe light is adjusted in this manner.

On the other hand, as shown in FIG. 9, the probe light and the WDM optical signal amplified by the optical amplifier 112 are input to an optical filter 176. The optical filter 176 passes the WDM optical signal while rejecting the probe light. That is, the cut-off wavelength of the optical filter 175 is set between the wavelength ranges of the WDM optical signal and the probe light.

An output of the optical filter 176 is input to the optical signal adding unit 119 via the LC 133.

The optical signal adding unit 119 wavelength-multiplexes an optical signal supplied from the added optical signal sender 138 via the LC 136 and the WDM optical signal output of the LC 133 and including only optical signals (channels) to pass through the OADM, and inputs a resulting WDM optical signal to the W-CPL 120.

Laser beams emitted from three LDs 168-1 to 168-3 having different oscillation wavelengths are input to a W-CPL 169 and wavelength-multiplexed with each other there, and resulting laser light is output of the W-CPL 169. The wavelength-multiplexed laser light is probe light for keeping the optical power of input light of the optical amplifier 122 constant in spite of increase or decrease in the number of channels of a WDM optical signal.

The prescribed wavelength is set on the wavelength that is similar to the one in the LD 162.

Probe light that is output of the W-CPL 169 is input to the W-CPL 120. The W-CPL 120 wavelength-multiplexes the probe light that is output of the W-CPL 169 with a WDM optical signal to be output of the optical signal adding unit 119. An output of the W-CPL 120 is input to the optical amplifier 122.

Referring to FIG. 7, an output of the W-CPL 120 is input to the CPL 254 of the optical amplifier 122, where it is branched into two parts. On part separated by the CPL 254 is input to the CPL 252. The other part is input to the PD 255. An output of the PD 255 is not only supplied to the gain/output controlling circuit 261 but also supplied to the A/D 127 as indicated by a broken line in FIG. 7. An output of the A/D 127 is input to a controlling circuit 170.

The controlling circuit 170 compares an output value of the A/D 127 with the reference value and outputs digital signals to respective D/A's 167-1 to 167-3 to adjust the outputs of the respective LDs 168-1 to 168-3 so that the output value of the A/D 127 becomes equal to the reference value.

The digital signals are converted by the respective D/A's 167-1 to 167-3 into analog signals, which are input to the respective LDs 168-1 to 168-3.

The driving currents of the respective LDs 168-1 to 168-3 are adjusted based on the received analog signals, whereby their laser light outputs are adjusted. The optical power of probe light is adjusted in this manner.

On the other hand, referring to FIG. 9, the probe light and the WDM optical signal that are output of the W-CPL 120 are amplified by the optical amplifier 122 and input to an optical filter 177. The optical filter 177 passes the WDM optical signal while rejecting the probe light. That is, the cut-off wavelength of the optical filter 177 is set between the wavelength ranges of the WDM optical signal and the probe light.

An output of the optical filter 177 is input to an optical transmission line, through which the WDM optical signal that is output of the OADM is transmitted to the next node.
(Operation and Advantageous Effects in the Fourth Embodiment)

Next, the principle of operation and the advantageous effects of the OADM according to the fourth embodiment will be described.

In the fourth embodiment, as in the case of the second embodiment, it is assumed that the maximum operable multiplex number is 32. In initial setting, reference values corresponding to a maximum operable multiplex number of 32 are selected from the correspondence table between the maximum operable multiplex number and the reference values that is stored in the memory 131. It is assumed that the reference values are outputs of the PD 155 that are produced when a 35-wave WDM optical signal is received by the PD 155.

When a 32-wave WDM optical signal is input from the pre-stage OADM to the OADM concerned under the above circumstances, the output of the PD 255 is smaller than the reference value by a value corresponding to three waves. Therefore, the controlling circuit 170 outputs signals that instruct to compensate for three waves to the LDs 162-1 to 162-3 via the D/A's 161-1 to 161-3. Each of the LDs 162-1 to 162-3 outputs laser light for one wave to the W-CPL 163 by increasing the driving current based on the received signal. As a result, the W-CPL 163 produces probe light for three waves. Since in this manner probe light is formed by three laser beams having different wavelengths, the optical power of laser light per one wavelength can be reduced. This inhibits spectral-hole burning.

The probe light that is output of the WDM 163 is input to the W-CPL 100. The W-CPL 100 wavelength-multiplexes the 32-wave WDM optical signal that is supplied from the pre-stage OADM with the probe light for three waves, and inputs a resulting WDM optical signal to the optical amplifier 102.

The probe light and the 32-wave WDM optical signal amplified by the optical amplifier 102 are input to the FIL 175. By rejecting the probe light, the FIL 175 inputs only the 32-wave WDM optical signal to the optical signal dropping unit 109. For example, the optical signal dropping unit 109 of the OADM drops optical signals of six channels to the dropped optical signal receiver 137 via the LC 135. As a result, an output of the optical signal dropping unit 109 is a 26-wave WDM optical signal.

Part of the 26-wave WDM optical signal is input to the PD 255 via the W-CPL 110 and the CPL 254.

The output of the PD 255 is smaller than the reference value by a value corresponding to nine waves. Therefore, the controlling circuit 170 outputs signals that instruct to compensate for nine waves to the LDs 165-1 to 165-3 via the D/A's 164-1 to 164-3. Each of the LDs 165-1 to 165-3 outputs laser light for two waves to the W-CPL 166 by increasing the driving current based on the received signal. As a result, the W-CPL 166 produces probe light for nine waves.

The probe light output of the W-CPL 166 is input to the W-CPL 110. The W-CPL 110 wavelength-multiplexes the 26-wave WDM optical signal that is supplied from the optical signal dropping unit 109 with the probe light for nine waves, and inputs a resulting WDM optical signal to the optical amplifier 112. As a result, optical power of 35 waves is input to the optical amplifier 112 irrespective of the number of channels of optical signals that are dropped by the optical signal dropping unit 109. Therefore, the optical amplifier 112 can operate stably.

The probe light and the 26-wave WDM optical signal amplified by the optical amplifier 112 are input to the FIL 176. The FIL 176 inputs only the 26-wave WDM optical signal to the LC 133 by rejecting the probe light. This can prevent nonlinear optical effects that would otherwise be caused in the LC 133 by the probe light.

The WDM optical signal output of the LC 133 is input to the optical signal adding unit 119.

If optical signals of three channels are supplied from the added optical signal sender 138 via the LC 136, a 29-wave WDM optical signal is produced and output of the optical signal adding unit 119. The 29-wave WDM optical signal is input to the PD 255 via the W-CPL 120 and the CPL 254.

Since the output of the PD 255 is smaller than the reference value by a value corresponding to six waves, the controlling circuit 170 outputs signals that instruct to compensate for six waves to the LDs 168-1 to 168-3 via the D/A's 167-1 to 167-3. Each of the LDs 168-1 to 168-3 outputs laser light for two waves to the W-CPL 169 by increasing the driving current based on the received signal. As a result, the W-CPL 169 produces probe light for six waves.

The probe light output of the W-CPL 169 is input to the W-CPL 120. The W-CPL 120 wavelength-multiplexes the 29-wave WDM optical signal that is supplied from the optical signal adding unit 119 with the probe light for six waves, and inputs a resulting WDM optical signal to the optical amplifier 122. Therefore, optical power corresponding to 35 waves is input to the optical amplifier 122 irrespective of the number of channels of optical signals that are added by the optical signal adding unit 119. Therefore, the optical amplifier 122 can stably operate.

The probe light and the 29-wave WDM optical signal amplified by the optical amplifier 122 are input to the FIL 177. By rejecting the probe light, the FIL 177 inputs only the 29-wave WDM optical signal to the optical transmission line to transmit it to the next node. This can prevent nonlinear optical effects that would otherwise be caused in the optical transmission line by the probe light.

Although the principle of operation and the advantageous effects of the second to fourth embodiments have been described by using specific numerical values, the invention is not limited to such cases.

Although the second to fourth embodiments are directed to the case where the OADM is connected to an optical transmission system for transmission between two end stations, the invention is not limited to such a case. For example, the OADM according to the invention can be applied to a ring network that connects a plurality of nodes in ring-like form.

The invention is not limited to the above embodiments and various modifications may be made without departing from the spirit and the scope of the invention. Any improvement may be made in part or all of the components.

What is claimed is:

1. An optical amplifying apparatus comprising:
   optical amplifying means for amplifying a wavelength-division multiplexed optical signal wherein a plurality of optical signals having different wavelengths are wavelength-multiplexed; and
   input light controlling means for inputting, to said optical amplifying means, probe light that serves to keep an optical power of light to be input to said optical amplifying means constant in accordance with a change in a number of optical signals of said wavelength-division multiplexed optical signal, wherein said input light controlling means comprises:
   a light source for generating said probe light,
   combining means for combining said probe light with light to be input to said optical amplifying means,
   detecting means for detecting said optical power of light to be input to said optical amplifying means, and
   controlling means for controlling said optical power of said probe light so that an output from said detecting means becomes approximately constant.

2. An optical amplifying apparatus according to claim 1, further comprising rejecting means for eliminating said probe light from light amplified by said optical amplifying means.

3. An optical amplifying apparatus according to claim 1, wherein said light source generates probe light wherein laser beams having different wavelengths are wavelengths multiplexed.

4. An optical amplifying apparatus according to claim 1, wherein:
   said light source is a semiconductor laser; and
   said controlling means controls the optical power of said probe light by adjusting a driving current of said semiconductor laser, so that an output from said detecting means becomes approximately constant.

5. An optical amplifying apparatus according to claim 1, wherein said controlling means is an optical attenuator for attenuating the optical power of said probe light output from said light source.

6. An optical amplifying apparatus according to claim 1, wherein said controlling means is an optical amplifier for amplifying the optical power of said probe light output from said light source.

7. An optical amplifying apparatus according to claim 1, further comprising a memory for sorting a maximum operable multiplex number of said wavelength-division multiplexed optical signal, and wherein said controlling means controls the optical power of said probe light based on a difference between a value of an output from said detecting means and a reference value greater than or equal to a value of the output from said detecting means that is obtained when a number of multiplexed optical signals in said wavelength-division multiplexed optical signal is equal to the maximum operable multiplex number.

8. An optical amplifying apparatus according to claim 1, further comprising a weighting filter provided prior to said detecting means so set that it has a maximum transmittance rate at a central wavelength in a gain band or at a wavelength of a maximum gain of said optical amplifying means, and whose transmittance rate decreases as a difference between the wavelength of said probe light and the central wavelength increases.

9. An optical amplifying method of amplifying a wavelength-division multiplexed optical signal wherein a plurality of optical signals having different wavelengths are wavelengths-multiplexed, comprising:

combining input light with probe light and outputting the combined light to optical amplifying means;

detecting the optical power of the combined light;

controlling an optical power of said probe light to be input to said optical amplifying means for amplifying said wavelength-division multiplexed optical signal in accordance with an increase or a decrease in the number of channels of said wavelength-division multiplexed optical signal; and keeping an optical power of the combined light to be input to said optical amplifying means approximately constant.

10. An optical amplifying apparatus comprising:

an optical amplifier amplifying a wavelength-division multiplexed optical signal wherein a plurality of optical signals having different wavelengths are wavelength-multiplexed; and an input light controller inputting, to said optical amplifier, probe light that serves to keep an optical power of light to be input to said optical amplifier constant in accordance with a change in a number of optical signals of said wavelength-division multiplexed optical signal, wherein said input light controller comprises:

a light source generating said probe light, a combiner combining said probe light with light to be input to said optical amplifier to thereby produce a combined light, a detector detecting an optical power of the combined light, and a controller controlling an optical power of said probe light so that the optical power detected by said detector becomes approximately constant.

11. The optical amplifying apparatus according to claim 10, further comprising a rejector eliminating said probe light from light amplified by said optical amplifier.

12. The optical amplifying apparatus according to claim 10, wherein said light source generates probe light wherein laser beams having different wavelengths are wavelengths multiplexed.

13. The optical amplifying apparatus according to claim 10, wherein:

said light source is a semiconductor laser; and said controller controls the optical power of said probe light by adjusting a driving current of said semiconductor laser, so that the output from said detector becomes approximately constant.

14. An optical amplifying apparatus according to claim 10, wherein said controller is an optical attenuator attenuating the optical power of said probe light output from said light source.

15. The optical amplifying apparatus according to claim 10, wherein said controller is an optical amplifier amplifying the optical power of said probe light output from said light source.

16. The optical amplifying apparatus according to claim 10, further comprising a memory sorting a maximum operable multiplex number of said wavelength-division multiplexed optical signal, and wherein said controller controls the optical power of said probe light based on a difference between a value of the output from said detector and a reference value greater than or equal to a value of the output from said detector obtained when a number of multiplexed optical signals in said wavelength-division multiplexed optical signal is equal to the maximum operable multiplex number.

17. The optical amplifying apparatus according to claim 10, further comprising a weighting filter provided prior to said detector set so that it has a maximum transmittance rate at the central wavelength in a gain band or at the wavelength of a maximum gain of said optical amplifier, and whose transmittance rate decreases as a difference between the wavelength of said probe light and the central wavelength increases.

18. An apparatus comprising:

a combiner combining a wavelength division multiplexed (WDM) light with probe light, to thereby produce a combined light, the WDM light including a plurality of optical signals multiplexed together;

an optical amplifier receiving the combined light and amplifying the WDM light in the combined light;

a detector detecting an optical power level of the combined light; and a controller controlling a power level of the probe light so that the power level of the combined light as received by the optical amplifier is maintained constant in accordance with changes in a number of optical signals in the WDM light.

19. An apparatus comprising:

means for combining a wavelength division multiplexed (WDM) light with probe light, to thereby produce a combined light, the WDM light including a plurality of optical signals multiplexed together;

an optical amplifier receiving the combined light and amplifying the WDM light in the combined light;

a detector detecting an optical power level of the combined light; and means for controlling a power level of the probe light so that the power level of the combined light as received by the optical amplifier is maintained constant in accordance with changes in a number of optical signals in the WDM light.

* * * * *